US012754842B1

(12) United States Patent
Giles et al.

(10) Patent No.: US 12,754,842 B1
(45) Date of Patent: *Oct. 6, 2026

(54) SYSTEM AND METHOD FOR PERSISTING HARDWARE TRANSACTIONAL MEMORY TRANSACTIONS TO PERSISTENT MEMORY

(71) Applicants: Ellis Robinson Giles, Houston, TX (US); Peter Joseph Varman, Houston, TX (US)

(72) Inventors: Ellis Robinson Giles, Houston, TX (US); Peter Joseph Varman, Houston, TX (US)

( * ) Notice: Subject to any disclaimer, the term of this patent is extended or adjusted under 35 U.S.C. 154(b) by 757 days.

This patent is subject to a terminal disclaimer.

(21) Appl. No.: 17/209,201

(22) Filed: Mar. 22, 2021

Related U.S. Application Data

(63) Continuation of application No. 16/010,063, filed on Jun. 15, 2018, now Pat. No. 10,956,324, which is a (Continued)

(51) Int. Cl.

*G06F 12/0804* (2016.01)
*G06F 9/30* (2018.01)

(Continued)

(52) U.S. Cl.

CPC ...... *G06F 12/0804* (2013.01); *G06F 9/30043* (2013.01); *G06F 9/3856* (2023.08);

(Continued)

(58) Field of Classification Search

CPC ............. G06F 12/0804; G06F 9/30043; G06F 9/3855; G06F 9/467; G06F 2212/1032; G06F 2212/608

See application file for complete search history.

(56) References Cited

U.S. PATENT DOCUMENTS 8,095,824 B2 * 1/2012 Gray ..................... G06F 11/141 714/16
8,397,014 B2 * 3/2013 Khmelnitsky ...... G06F 12/0246 711/103

(Continued)

OTHER PUBLICATIONS

Doshi, K. and Varman, P., WrAP: Managing Byte-Addressable Persistent Memory, Memory Organization and Architecture Workshop (MeaoW'12), Oct. 2012. Attached to this office action and available online at http://varman.rice.edu/conferences/ (Year: 2012).*

(Continued)

*Primary Examiner* — Janice M. Girouard

(57) ABSTRACT

Persistent Memory, byte-addressable non-volatile memory technologies, offer performance advantages and access similar to Dynamic Random Access Memory while having the persistence of disk. Hardware Transactional Memory support, originally designed for DRAM concurrency control, can corrupt persistent memory transactions due to cache evictions before system failure. Unifying storage and memory on the main-memory bus and accessed directly while using HTM for concurrency control has previously required the additional burden of changes to processors to prevent possible data corruption.

The present invention provides a solution for the durability of transactions to persistent memory while using HTM as a concurrency control mechanism, without any changes to processors or cache-coherency mechanisms. The invention includes a software only method and system that provides durability and ordering of HTM transactions to persistent memory. The invention also discloses a back-end memory controller that supports HTM transactions for durability to persistent memory without up-front processor changes.

17 Claims, 30 Drawing Sheets

Related U.S. Application Data continuation-in-part of application No. 14/457,113, filed on Aug. 11, 2014, now Pat. No. 10,163,510.

(60) Provisional application No. 62/520,541, filed on Jun. 15, 2017, provisional application No. 61/864,635, filed on Aug. 11, 2013, provisional application No. 61/864,522, filed on Aug. 9, 2013.

(51) Int. Cl.
*G06F 9/38* (2018.01)
*G06F 9/46* (2006.01)

(52) U.S. Cl.
CPC ...... *G06F 9/467* (2013.01); *G06F 2212/1032* (2013.01); *G06F 2212/608* (2013.01)

(56) References Cited

U.S. PATENT DOCUMENTS

| | | | | |
|---|---|---|---|---|
| 8,719,828 B2 * | 5/2014 | Lewis | G06F 9/467 | 718/101 |
| 2016/0004558 A1 * | 1/2016 | Busaba | G06F 9/5044 | 711/123 |
| 2016/0314044 A1 * | 10/2016 | Marathe | G06F 11/1471 | |
| 2017/0177365 A1 * | 6/2017 | Doshi | G06F 9/30087 | |

OTHER PUBLICATIONS

An article by Ellis Giles, Kshitij Doshi, and Peter Varman titled “Software support for atomicity and persistence in non-volatile memory.” Memory Organization and Architecture Workshop (MeaoW’13). Memory Organization and Architecture Workshop, 2013. (Year: 2013).*

An artile titled “SoftWrAP: A Lightweight Framework for Transactional Support of Storage Class Memory” E. R. Giles, K. Doshi and P. Varman, “SoftWrAP: A lightweight framework for transactional support of storage class memory,” 2015 31st Symposium on Mass Storage Systems and Technologies (MSST) (Year: 2015).*

An article titled Transaction memory: architectural support for lock-free data structures by J. Eliot B. Moss et al available online at https://dl.acm.org/doi/abs/10.1145/165123.165164 (Year: 1993).*

An artitle titled Software Support for Atomicity and Persistence in Non-volatile Memry by Giles, Doshi, and Varman available online at https://citeseerx.ist.psu.edu/document?repid=rep1&type=pdf&doi=06ce5f5056277e6b16f87d9fbcaeda4c2fc8e7fe (Year: 2013).*

An article titled “Transactional Memory: History and Development” by JIghtuse, published May 15, 2014 (Year: 2014).*

A Merriam Webster definition of “isolate” (Year: 2013).*

Intel’s Programmers Reference Manual showing the DEC and INC processor commands (Year: 1986).*

* cited by examiner

```
// Transactional Routines
transferFunds(fromAccount, toAccount);
begin
    Trans_Begin
    toAccount += amount;
    fromAccount -= amount;
    Trans_Commit ;

addMonthlyInterest(balances, numAccts);
begin
    Trans_Begin
    for (int i=0; i < numAccts; i++)
    balances[i] *= (1+rate/12);
    Trans_Commit ;
```

FIG. 4

```
//  Persistent Atomicity
//  x and p are allocated by p_malloc and are persistent
wrap_open: :
begin
    x = 1; // Update persistent memory location
    .........
    p = p_malloc(100); // Allocate persistent memory array
    .........
    for (i = 0; i < 25; i++) ;
    begin
        p[i] = i;
    .........
: : wrap_close
```

FIG. 5

```
//  Atomic region for persistent stores
wrapToken wid = wrapOpen();
wrapStore(wid, &x, 1);
…
temp = p_malloc(100);
wrapStore(wid, &p, temp);
…
for (i = 0; i < 25; i++)
  wrapStore(wid, p+i, i);
wrapClose(wid);
```

FIG. 6

```
wrapOpen (options o = default)
begin
    if WrapNestingDepth == 0 then
        Acquire handle to AliasTable;
        Open RedoLog;
    WrapNestingDepth += 1;

wrapLoad (address a)
begin
    if Entry for a in AliasTable then
        Return value from AliasTable;
    Return value from SCM address a;

wrapStore (address a, value newVal)
begin
    if No entry for a in AliasTable then
        Add (a, newVal) to AliasTable;
    else
        Update (a, newVal) in AliasTable;
    Append (φ(a), newVal) to RedoLog;
```

FIG. 10

```
wrapRead (address src, size n)
begin
    Break up n-byte address range of src into
                    aligned page sequences S_i;
    for (each page S_i) {
    if Entry for D_i in AliasTable then
        Return D'_i;
    Return D_i;
    }

wrapWrite (address dest, address src, size n)
begin
    Break up n-byte address range of src and dest into
          aligned page sequences S_i and D_i respectively;
    for (each page D_i in the destination) {
    if (No entry for D_i in AliasTable) then
        Allocate Shadow DRAM page D'_i for D_i;
        Add (D_i, D'_i) to AliasTable;
    Update page addressed by D'_i from S_i // Write DRAM
    Append (φ(D_i), D_i) to RedoLog;
    }

wrapClose ()
begin
    WrapNestingDepth -= 1;
    if WrapNestingDepth == 0 then
        // Commit all log records to persistent memory
    PCOMMIT;    // Stall until pending persistent memory
                        writes are committed to SCM
```

FIG. 15

```
// x, y and z are persistent variables
atomic_begin          | id = OpenWrap();
x = 1;                | wrapStore(id, &x, 1);
........
y = 2;                | wrapStore(id, &y, 2);
........
z = x;                | temp = wrapLoad(&x);
                      | wrapStore(id, &z, temp);
.........
atomic_end            | CloseWrap(id);
```

```
HandleOpenWrap (wrapId w)
        openWraps = openWraps ∪ {w};

HandleCloseWrap (wrapId w)
        Add bucket w to end of closedBuckets list;

CacheEvict (block address B, data d)
        DS_B = openWraps;
        Add (B, DS_B) to VictimCache;

CacheMiss (block address B)
        if (block B not in VictimCache)
            Forward memory request to SCM;
        else
            Return value of block B from VictimCache;

RetireWrap (wrapId w)
        for each address a ∈ bucket(w)
                Store val(a) in SCM address a;
        for each block B ∈ VictimCache
                DS_B = DS_B - {w};
                if (DS_B == Φ)
                    Delete block B from the VictimCache;
        openWraps = openWraps - {w};
```

FIG. 18

| T | Operation | openWraps | Victim Cache |
|---|---|---|---|
| 1 | openWrap(1) | $\{1\}$ | $\Phi$ |
| 2 | *CacheEvict*(A) | $\{1\}$ | $\{A\}$ |
| 3 | openWrap(3) | $\{1,3\}$ | $\{A\}$ |
| 4 | *CacheEvict*(B) | $\{1,3\}$ | $\{A,B\}$ |
| 5 | *CacheMiss*(A) | $\{1,3\}$ | $\{A,B\}$ |
| 6 | *CacheEvict*(A) | $\{1,3\}$ | $\{A,B\}$ |
| 7 | CloseWrap(3) | $\{1,3\}$ | $\{A,B\}$ |
| 8 | CloseWrap(1) | $\{1,3\}$ | $\{A,B\}$ |
| 9 | RetireLogBucket(3) | $\{1\}$ | $\{A,B\}$ |
| 10 | RetireLogBucket(1) | $\Phi$ | $\Phi$ |

FIG. 19

```
// x and y are persistent variables initially all 0

T1                          T2
atomic_begin;               atomic_begin;
  x = 3;                      x = 5;
atomic_end;                   y = x;
                            atomic_end;
```

FIG. 20

| | SCM Writes | *pcommits* | Estimated Time |
|---|---|---|---|
| Non-Atomic | n | 1 | $nT_w + T_s$ |
| Undo Log | $2n + 1 +$ $\lceil 12n/64 \rceil$ | $n + 1$ | $n(2T_w + T_s) +$ $\lceil 12n/64 + 1 \rceil T_w + T_s$ |
| SoftWrAP | $1 +$ $\lceil 12n/64 \rceil$ | 1 | $T_w + max(n * T_{alias},$ $\lceil 12n/64 \rceil T_w) + T_s$ |

FIG. 21

```
OpenWrap():
  Allocate private Alias Table in DRAM;
  Allocate Log Bucket in NVM;

WrapStore(id, addr, val):
  Update or Add to Alias Table entry addr with val;
  Write < addr, val > to Log Bucket [id] in NVM;

WrapLoad(id, addr):
  Return val from Alias Table entry addr if present;

CloseWrap():
  PCOMMIT to make log records durable;
  For each entry in the Alias Table:
    Non-blocking cached store val to SCM addr; CLWB addr;
  Reclaim Local Alias Table and Commit Transaction;
```

FIG. 25

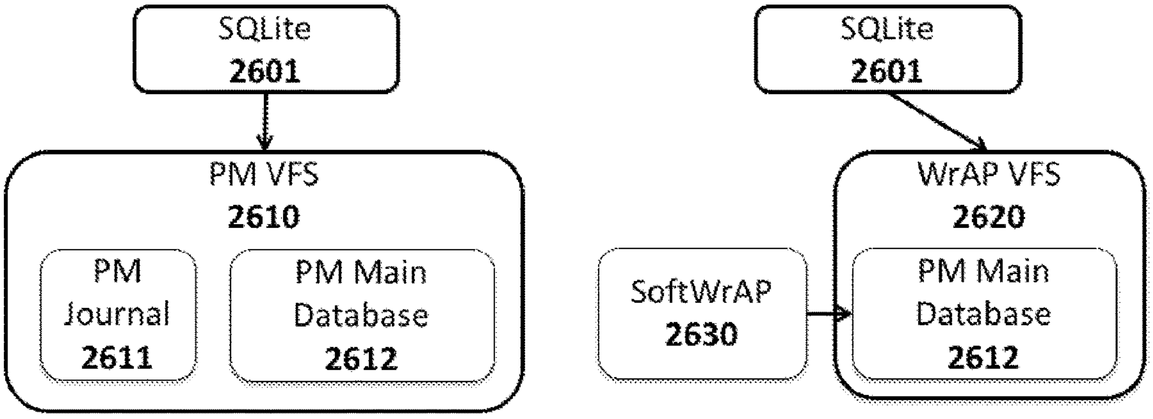

FIG. 26

Ordering Queues
2910

| Blue Start Token | Next Blue | Blue End | Log Pointer | Red Time | Next Red Index | Array Index |
|---|---|---|---|---|---|---|
| 0 | 0 | 0 | 0 | 0 | 0 | 0 |
| 9 | 0 | 15 | 0 | 1241191 | 5 | 1 |
| 0 | 0 | 0 | 0 | 0 | 0 | 2 |
| 11 | 14 | 0 | 0 | 0 | 0 | 3 |
| 12 | 0 | 14 | 0x781 | 1224767 | 1 | 4 |
| 13 | 0 | 15 | 0 | 1244819 | END | 5 |
| 14 | END | 0 | 0 | 0 | 0 | 6 |
| 0 | 0 | 0 | 0 | 0 | 0 | 7 |

Red-Blue Min 2913

Blue Head Token 2914

Blue Tail Token 2915

Red Head Index 2916

FIG. 30

```
TransactionStart ()
        myId = QueueNotifyStart();
        myObservedMin = QueueGetMin();
        Open Log and persist startTS=myId;
        XBegin();
TransactionEnd ()
        *myPersistentTS = RDTSCP();
        XEnd();
        QueueNotifyEnd(myId, *myPersistentTS);
        Persist cached Log and timestamps to NVM;
        QueueTxCommit(myId, Log);
Load (address)
        Entry *e = getAliasTableEntry(address);
        if (e->address = address))
            return e->Value;
        else return *address;
Store (address, value)
        Entry *e = getAliasTableEntry(address);
        // Abort if entry not found and min entry not retired:
        if (e->Address ≠ address AND
          (e->id > myObservedId)) XAbort();
        // Save the write and log with myId start time:
        e->Address = address;
        e->Value = value;
        e->TStart = myId;
        Append (address, value) to cached Log;
getAliasTableEntry (address)
        line = getLine(address);
        for (entry = each element in line) {
            if (entry->address = address)
                return entry;
            if (entry->TStart < minTStart) {
                minTStart = entry->TStart;
                minEntry = entry;    }    }
        return minEntry;
```

FIG. 33

```
QueueNotifyStart ()
        AtomicFetchAndAdd(&numElements, 1);
        id = AtomicFetchAndAdd(&TxCounter, 1);
        Q[id & Mask].startTS = id;  // Save token number.
        sfence();
        return id;  Return the transaction token.
QueueNotifyEnd (id, persistentTS)
        currentTxCounter = TxCounter;
        ti = id & Mask;
        Q[ti].persistentTS = persistetTS;
        while (true) {
          i = FindInsertNode(ti, persistentTS);
          if (i == HEAD)  {
            if (CAS(&redHead, Q[ti].nextRed, ti)) break;
          } else if (CAS(&(Q[i].nextRedIndex),
                  Q[ti].nextRedIndex, ti)) break;  }
        Q[tokeni].endTS = currentTxCounter;  sfence();
QueueGetMin ()
        return TxMin;
QueueTxCommit (startTS, logPointer)
        Q[startTS & Mask].logPointer = logPointer;
        sfence();
        while (numElements ≥ ℒ);  // Wait State.
FindInsertNode (token, persistentTS)
        // Walk Red Queue find persistentTS insertion point
        // with increasing time. Return parent node index.
```

FIG. 34

```
CheckRetirement ()
        ri = redHead;
        if ((Q[ri].endTS > 0) and (Q[ri].logPointer ≠ 0)
          and (Q[ri].endTS ≤ UpdatedBlueHead())) {
            next = Q[ri].nextRedIndex];
            if (!CAS(&(Q[ri].nextRedIndex), next,
                next+FLAG)) return;
            if (CAS(&redHead, ri, next) {
                Retire(Q[ri].logPointer);
                if (Q[ri].startTS == TxMin)
                    CAS(&TxMin, Q[ri].startTS, UpdatedMin());
                Q[ri].startTS = Q[ri].endTS = 0;
                Q[ri].logPointer = Q[ri].priorityTS = 0;
                Q[ri].nextRedIndex = EMPTY;  sfence();
                AtomicAdd(&numElements, -1);
            } else Q[ri].nextRedIndex = next;
        }
UpdatedMin ()
        // Walk from TxMin to next non-empty Q[i].startTS
UpdatedBlueHead ()
        static blueMin = 0;
        if (blueMin == TxCounter) return blueMin;
        while (Q[blueMin & MASK] != 0)
            blueMin++;
        return blueMin;
RetirementThread ()
        while (!done OR (numElements > 0))
            CheckRetirment();
Retire (log)
        walk log and write *address=value;
        sfence();
```

FIG. 35

```
User Level Software WrAP Library:

OpenWrapC ()
    // ------- State: OPEN -------
    wrapId = threadId;
    Notify Controller Open Wrap wrapId;
    startTime = RDTSCP();
    Log[wrapId].startTime = startTime;
    Log[wrapId].writeSet = {};
    sfence();
    CLFLUSH Log[wrapId];
    sfence();
    // ------- State: COMPUTE -------
    HTMBegin();   // XBegin

wrapStore (addrVar, Value)
    Add {addrVar, Value} to Log[wrapId].writeSet;
    Normal store of Value to addrVar;

CloseWrapC (strictDurability)
    Log[wrapId].persistTime = RDTSCP();
    HTMEnd();   // XEnd
    // ------- State: LOG -------
    CLFLUSH Log[wrapId].persistTime;
    for num cachelines in Log[wrapId].writeSet
        CLFLUSH cacheline;
    if (strictDurability)
        durabilityAddr = 0; // Reset Flag;
        tAddr = durabilityAddr;
    else tAddr = 0;
    sfence();
    // ------- State: CLOSE -------
    Notify Controller Closed (wrapId, tAddr);
    // ------- State: COMMIT -------
    if (strictDurability)
        // Wait for durable notification from controller
        Monitor durabilityAddr;
```

FIG. 38

```
Persistent Memory Controller :

Open Wrap Notification (wrapId)
    Add wrapId to Current Open Transactions COT;

Memory Write (memoryAddr, data)
    // Triggered from cache evict or stream store.
    if ((memoryAddr not in Pass-Through Log Area) and
      (Current Open Transactions COT != {}))
        Add (memoryAddr, data, COT) to VDB;
    else
        // Normal memory write
        Memory[memoryAddr] = data;

Memory Read (memoryAddr)
    if (memoryAddr in Volatile Delay Buffer)
        return latest cacheline data from VDB;
    return Memory[memoryAddr];

Close WrAP Notification (wrapId, durabilityAddr)
    Remove wrapId from Current Open Transactions COT;
    if (durabilityAddr)
        durabilityDS = COT;
        // Add pair to Durability Wait Queue DWQ;
        Add (durabilityDS, durabilityAddr) to DWQ;
    Remove wrapId from Volatile Delay Buffer elements
    if earliest VDB elements have empty DS
        // Write back entries to memory in FIFO order
        Memory[memoryAddr] = data;
    Remove wrapId from Durability Wait Queue elements
    if earliest DWQ elements have empty DS
        // Notify waiting thread of durability
        Memory[durabilityAddr] = 1;
```

FIG. 39

SYSTEM AND METHOD FOR PERSISTING HARDWARE TRANSACTIONAL MEMORY TRANSACTIONS TO PERSISTENT MEMORY

CROSS-REFERENCE TO RELATED APPLICATIONS

This application is a continuation of and claiming the benefit of pending U.S. patent application Ser. No. 16/010,063 filed Jun. 15, 2018 entitled "System and Method for Persisting Hardware Transactional Memory Transactions to Persistent Memory," which is a continuation in part of and claiming the benefit of U.S. patent application Ser. No. 14/457,113, now U.S. Pat. No. 10,163,510 issued Dec. 25, 2018, filed Aug. 11, 2014 entitled "System and Method for Atomic Persistence in Storage Class Memory" which claims the benefit of U.S. Provisional Application No. 61/864,522 filed Aug. 9, 2013 and titled "Method, Apparatus, and System for Write Aside Persistence Support for Storage Class Memories" and which also claims benefit of U.S. Provisional Application No. 61/864,635 filed Aug. 11, 2013 titled "Method and System for Software Support for Atomicity and Persistence in Non-Volatile Memory." U.S. patent application Ser. No. 16/010,063 also claims the benefit of U.S. Provisional Application No. 62/520,541 filed Jun. 15, 2017 and titled "System and Method for Persisting Hardware Transactional Memory Transactions to Storage Class Memories."

FIELD OF THE INVENTION

The invention relates to computer systems and the use of persistent memory, byte addressable, non-volatile memory, in computer systems for persistent storage utilizing Hardware Transactional Memory as a concurrency control mechanism. More specifically, the invention relates to novel methods for updating persistent memory, byte addressable, non-volatile memory, atomically and durably utilizing Hardware Transactional Memory as a concurrency control mechanism while maintaining fast paths to data and the high performance of systems.

BACKGROUND OF THE INVENTION

The emerging field of byte-addressable, Non-Volatile Memory (NVM) technology unveils a new area for researchers in both computer architecture and software design. This Persistent Memory, or PM, resides on the main-memory bus alongside DRAM and is subject to cache-evictions. New Hardware Transactional Memory (HTM) concurrency control mechanisms, originally designed for DRAM, can leave PM in a corrupt state if a system failure were to occur.

Persistent Memory, sometimes called Storage Class Memory (PM), is a group of new technologies that include but is not limited to Phase Change Memory (PCM), battery backed DRAM, Magnetoresistive Random Access Memory, Spin-Transfer Torque Random Access Memory, Flash-backed DRAM, Resistive Random Access Memory, and other memristor based technologies, and combinations of these technologies. PCM shows promise in that it can achieve a high chip density and speed. These properties will enable the creation of systems with large amounts of persistent, byte-addressable memory that can replace slow, block based Flash or hard disk drives.

Persistent Memory promises a persistent, high-speed, byte-addressable memory that can reside alongside DRAM on the main memory bus. The byte-addressable nature of PM combined with persistence, give rise to a new breed of approaches to persistence that no longer have to write data in a slow, block addressed manner to a backend data store such as a hard drive or Flash. Additionally, legacy applications can take advantage of PM to achieve better performance. Advances in database technology such as graph-based and main-memory databases that utilize in-memory data structures are perfect examples of software applications that will benefit from PM. These software applications must continue to provide varying levels of transactional support to users.

New Main-Memory DataBases (MMDB) such as CSQL and VoltDB and graph databases such as Neo4j and SAP HANA require low latency and are read intensive. They often have low locality and random reference patterns. These types of software applications can take advantage of high density, low-latency, byte-addressable, persistent memory attached to the main memory bus. The different transactional methods that each database provides can reside on top of a byte-addressed, persistent memory rather than a slow, block based storage device.

In order to ensure the atomicity and durability of in-memory, persistent data structures, a mechanism is needed by which writing data to PM is performed in an atomic and serialized manner. Just writing data to memory locations might have data being caught in the cache hierarchy. Flushing data or stream a store to persistent memory will add data to a write queue in the memory controller, but the data still has no guarantee of being written to persistent memory. A fence instruction might help, but groups of stores still run into the same problem, in that some of the stores might progress all the way to persistent memory while others do not, making the system subject to failure during a system crash. Guaranteeing transactional execution while exploiting the cache hierarchy is not straightforward.

Recent research areas also show that processing triple-store, Resource Description Framework (RDF) data in PCM is much faster than flash or disk based methods. Whole-system persistence (WSP) methods allow for in memory databases, but utilize a flush-on-fail and not-flush-on-commit strategy that relies on batteries to power persistent memories on system failure.

Research in persistent file systems built on PM is also a promising area that might quickly enable software applications to take advantage of PM. Persistent Memory File System (PMFS) uses sequences of memory fence and cache-line-flush operations to perform ordering and flushing of load and store instructions and requires garbage collection. BPFS uses copy on write techniques along with hardware changes to provide atomic updates to persistent storage. However, these methods require synchronous copy-on-write and synchronous logging methods.

Research into new data structures such as in NV-heaps, which use logging and copying, show support of ACID components in software applications using PM. Consistent and Durable Data Structures (CDDS) provides a versioning method that copies data and uses sequences of fences and flushes to provide transaction support. Mnemosyne provides several primitives for persistent variable support and has a transaction mechanism, which supports ACID options, but also relies on a log and write-through stores, fences, and flushes.

BPFS and NV-heaps require changes to the system architecture to support the atomicity and consistency of data. These changes are significant since they are up front, such as cache line counters and tags.

Adding concurrency control complicates the situation. Specifically, Hardware Transactional Memory technologies, originally designed for DRAM, are built on the well-known cache-coherence protocols. These protocols are established, and any suggested changes to the processor or protocols should not be taken lightly.

HTM is an easy to use concurrency control mechanism that gains tremendous benefits for applications requiring concurrent threads of execution as it tracks dependency sets and takes locks in hardware. HTM allows the ease of programming coarse-grained locks with fine-grained performance.

However, HTM is problematic for PM. HTM transactions make all stores visible at the end of a transaction. Therefore, a subsequent cache eviction of a partial transaction values and value propagation to persistent memory can corrupt an in-memory data structure if a failure were to occur. Even flushing a transaction's values to persistent memory after HTM completion could corrupt data if a partial flush or updates from another partial transaction were to overwrite the values. Even further, HTM transactions abort if flushing data out of a cache, so no log can be created during the HTM, and creating a log afterwards can have partial updates.

SUMMARY OF THE INVENTION

Transactional applications require that a sequence or group of store operations to persistent memory be performed atomically even if interrupted by a machine restart. That is, following the restart the state of persistent memory should either reflect none of the changes of the atomic write sequence or all of these locations should reflect the updated values.

In the present invention, persistent data is stored in non-volatile memory, persistent memory, and managed by an interface layer. Applications use familiar methods to access memory in their address space. Subsequently, memory load and store instructions are used to access the data for reading and writing the data; these accesses are intercepted by the underlying caching mechanism and moved to and from the cache hierarchy just as accesses to regular Dynamic Random Access Memory (DRAM). Transactions utilize Hardware Transactional Memory (HTM) support for concurrency control.

The present invention provides a guaranteed transactional execution while exploiting the fast, cache hierarchy and HTM concurrency control. It provides a lightweight solution for the atomicity and durability of write operations to persistent memory, while simultaneously supporting fast paths through the cache hierarchy to memory and HTM for concurrency control. The invention includes a software only method and system that provides atomic persistence to persistent memory using a software alias, ordering mechanisms, and log in nonvolatile memory. The invention also includes a back-end memory controller solution with modifications to the memory hierarchy comprising a victim cache and additional memory controller logic.

In an embodiment of the presented invention with hardware supported added to computer architecture, a new transaction creates a log structure in persistent memory. Stores to persistent memory locations are streamed to the log and written to their corresponding memory location in the cache hierarchy. An added victim cache for persistent memory addresses catches cache evictions, which would corrupt open transactions. On the completion of a group of atomic persistent memory operations, the log is closed and the persistent values in the cache can be copied to their source persistent memory location and the log cleaned. In another embodiment, the values may flow from the victim cache as a volatile delay buffer. This is accomplished using additional logic in the memory controller or software supported with additional instructions or hardware methods.

When no hardware support for lightweight atomic transactions to persistent memory is present, a software only solution is also available. In another embodiment of the invention, a software solution is presented with an aliasing mechanism and HTM durability ordering mechanism. To prevent cache evictions in open groups of atomic persistent memory operations, instead of using the destination location of a desired data write operation, an aliased location in memory is used. A similar log structure is utilized that can also have streaming stores, bypassing the cache hierarchy for additional speedup. When utilizing HTM for concurrency control, a store set is saved during the concurrency section to avoid aborting a transaction and persisted to a log for durability once concurrency is complete. Ordering queues are utilized to track partially completed transactions.

BRIEF DESCRIPTION OF THE DRAWINGS

FIG. 4 is an example of pseudo-code for transactional routines to transfer funds and accumulate monthly interest.

FIG. 5 is an example of an atomic persistent region of program code using open and close constructs where the persistent routines are called by the compiler or parser.

FIG. 6 is an example of an atomic persistent region of program code using explicit application program interface calls into routines for atomic persistence for storing and loading values with byte addressable, persistent memory.

FIG. 10 is example pseudo-code for atomic store and transaction close procedures to persistent memory for a copy-on-write approach to byte addressable, persistent memory.

FIG. 15 is example pseudo-code for atomic store and transaction close procedures to persistent memory for a write-aside approach to byte addressable, persistent memory.

FIG. 18 shows operations that may be performed by the PM controller.

FIG. 19 is an example Controller operations sequence for wraps 1-3 and variables A and B.

FIG. 20 is an example fragment that shows how allowed memory ordering depends on the isolation mode and persistence ordering depends on the order in which wraps close, with x and y as persistent variables initially all zero and T1 and T2 as transactions with atomic begin and ends.

FIG. 21 shows the performance benefits from using the SoftWrAP approach over traditional methods for atomic durable persistence.

FIG. 25 is an example pseudo-code for Open and Close Wraps along with reading and writing values.

FIG. 26 shows using of SoftWrAP in an existing database such as SQLite can be performed through a Pluggable Virtual File System Implementations using PM for block writes and using SoftWrAP.

FIG. 30 is an embodiment of the ordering queues for HTM transactions to PM using a single table that can be accessed in an obstruction free manner.

FIG. 33 shows the computer pseudo program code for a transactional interface.

FIG. 34 shows computer pseudo program code for helper functions for transactions to utilize ordering queues.

FIG. 35 shows computer pseudo program code for ordering queue management to order transactions utilizing HTM concurrency control for persistent memory.

FIG. 38 shows the user-level software library that supports the back-end persistent memory controller and HTM concurrency-controlled transactions.

FIG. 39 shows the logic that the persistent memory controller can follow to ensure durability of persistent memory transactions utilizing HTM.

DETAILED DESCRIPTION OF THE INVENTION

The emerging field of byte-addressable, Non-Volatile Memory (NVM) technology unveils a new area for researchers in both computer architecture and software design. Persistent Memory (PM) is a group of new technologies that include but is not limited to Phase Change Memory (PCM), battery backed DRAM, Magnetoresistive Random Access Memory, Spin-Transfer Torque Random Access Memory, Flash-backed DRAM, Resistive Random Access Memory, and other memristor based technologies. PCM shows promise in that it can achieve a high chip density and speed. These properties will enable the creation of systems with large amounts of persistent, byte-addressable memory that can replace slow, block based Flash or hard disk drives. Utilizing HTM for concurrency control mechanisms is difficult in that HTM transactions will abort if flushing values to a persistent log and, since all values are visible instantly after the HTM section, a subsequent cache eviction and failure, might corrupt an in-memory data structure.

Figure 1:
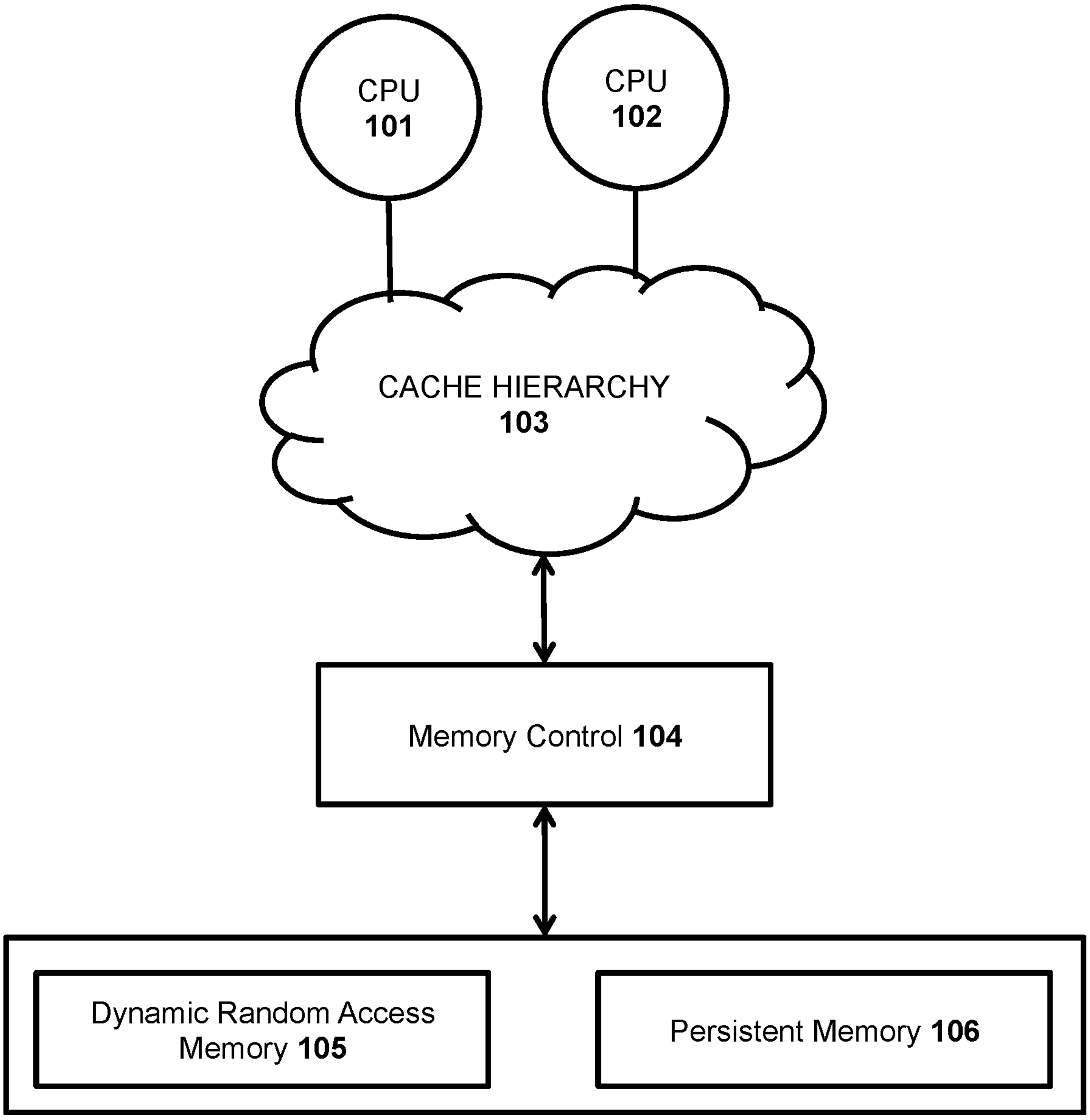
FIG. 1 is a diagram illustrating exemplary computer architecture of processor, cache, memory controller, and placement location of a persistent memory device near Dynamic Random Access Memory.

Now referring to FIG. 1. A Central Processing Unit (CPU) 101 is connected to a cache hierarchy 103 comprising one or more levels of caching. Additional Central Processing Units, such as 102, may be attached to the cache hierarchy 103. If so, then the cache hierarchy 103 needs to be coherent. A memory control unit 104 controls access to main memory for the system and can contain any level of buffering and update policy. One possible placement of byte-addressable, nonvolatile persistent memory 106 is alongside Dynamic Random Access Memory 105 in the main memory bus.

Additional configurations for Persistent Memory 106, Dynamic Random Access Memory 105, and Memory Control 104 are possible. Persistent memory might employ its own memory control unit and could be placed on a separate data bus.

Figure 2:
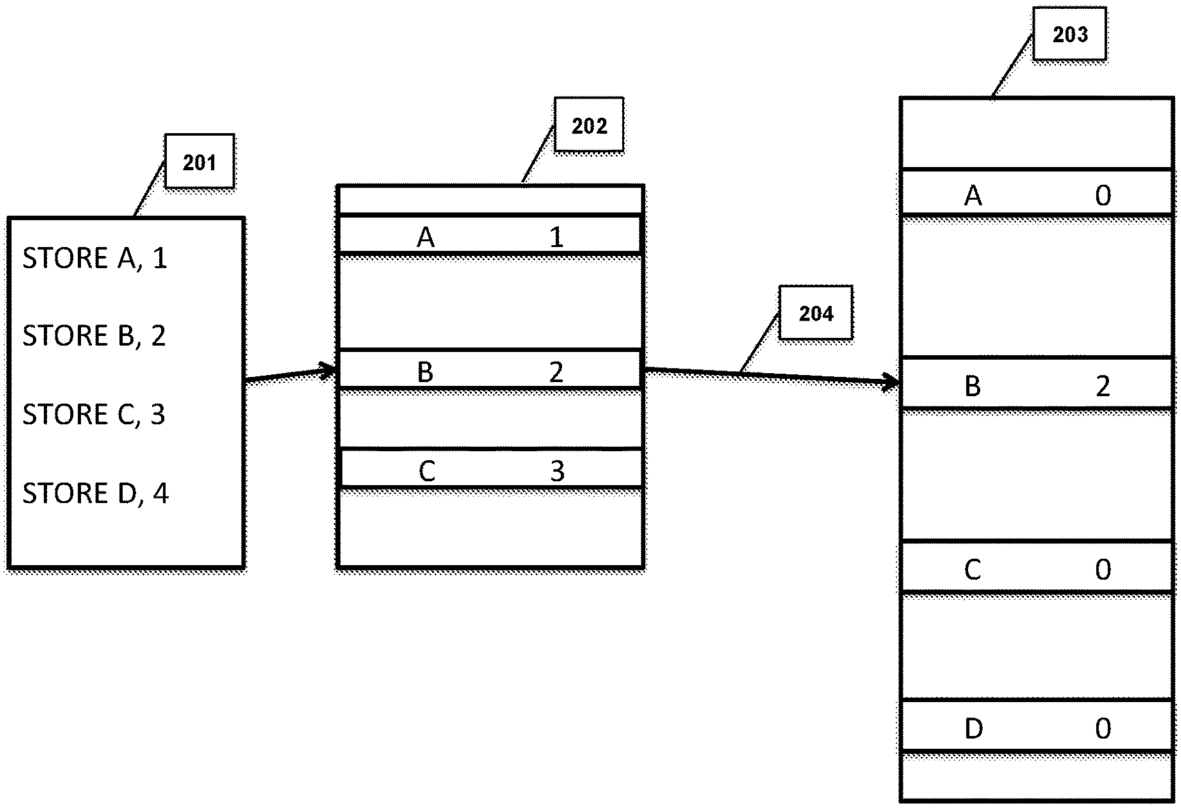
FIG. 2 is a diagram showing the difference between user address space, cache and memory values.

Now referring to FIG. 2. Transactional applications require that a sequence of store operations to persistent memory be performed atomically even if interrupted by a machine restart. That is, following the restart, the state of persistent memory should either reflect none of the changes of the atomic write sequence or all of these locations should reflect the updated values. A solution must exploit memory reuse by utilizing the processor cache hierarchy to transmit values both within a transaction as well as between transactions. FIG. 2 shows an additional issue that arises in implementing atomicity. The example atomic region 201 includes writes to four persistent variables A, B, C and D. Suppose that the system crashes immediately after the store to C. At that point the updates to A, B and C have been recorded somewhere within the cache hierarchy 202 but may or may not have reached a persistent memory location 203. The figure shows a possible execution sequence where the cache line corresponding to B has been evicted to persistent memory location 203 due to normal cache management operations, while A and C are still present only in the cache. This is the complementary problem to that caused by some persistent updates not having been evicted to persistent memory at the time of the crash. Hardware-based cache control mechanisms to control the order of cache evictions have been proposed to mitigate such problems but require significant changes to the cache structure. The implications of such changes on the wider cache operations have not been addressed. The present invention does not require any modifications of the cache subsystem operations.

Now referring to FIG. 4. Consider a simple, single-threaded software program that might perform updates to account balances such as transferring money between two accounts or accruing monthly interest. The two functions in pseudo-code, transferFunds and addMonthlyInterest, show separate in-memory account update operations for transfer and interest calculation.

The group of operations contained in the begin section is called a transaction. If the single-threaded program was running in traditional volatile memory and did not need to persist any data, then there is no problem. However, if the program needs to save account balances in case of a system failure, it is crucial that the data is consistent. Instead of saving the account data to a back-end, block-based disk store, suppose the program maintains the account balances directly in persistent memory. The account balances might appear to be persistent in memory, but several things can happen.

First, in the case of a balance transfer, if the system were to fail after adding money to account A but before subtracting from account B, then the overall consistency in the amount of money being tracked by the program is not preserved. The transfer of money between the two accounts needs to be atomic, either the money is transferred or it is not. The same problem exists when updating a large number of accounts in the interest calculation example. Next, even if the system does not fail and the program finishes an update and reaches the commit comment, some or all of the new account balances might be stuck in the cache and not written to persistent memory. The state of the data should be consistent and durable, and the transaction should not be lost. Finally, if the program were to flush all the updated balances from the cache to persistent memory after completing the transaction, a system failure could happen during this flush making the system inconsistent, e.g. the group of balance updates would no longer be atomic, since only some memory locations might have been updated.

The program might attempt to implement some type of logging mechanism to preserve the integrity of the data. As in a balance transfer above, the intermediate operations enclosed in the begin section must be performed in an atomic manner. A copy of the data could be updated or the old data could be copied and saved in case of a system failure. However, copying data requires additional overhead.

If the program is multi-threaded, then there are other concerns such as isolating transactions that haven't completed from other operations, e.g. if balance queries on accounts A and B were being performed during the middle of a balance transfer, the amount of money reported might be incorrect. Databases often provide transactional guarantees by implementing locking as well as logs. A transaction must satisfy ACID properties—Atomic (a transaction executes completely or not at all), Consistent (the state of the system is preserved), Isolated (a transaction is unaffected by other concurrent transactions), and Durable (if committed, a transaction will not be lost).

In the case of a balance transfer, if the system were to fail after the store operation updating toAccount but before the update of fromAccount, then the atomicity property would be violated. The problem is compounded because of the uncertainty in store completions in a high-performance memory system. Just because program control reaches commit without failure is not in itself a guarantee of successful atomic execution, since some or all of the updates might still be stuck in the cache hierarchy and not yet written to persistent memory. If the program were to flush all the updates from the cache to persistent memory after completing the transaction, a system failure could still happen during this flush and would not be atomic. A similar problem exists in the interest calculation example, still referring to FIG. 4, addMonthlyInterest. Should the loop be interrupted by a machine restart, it is impossible to know which of the accounts values in persistent memory represent updated values, even if program-visible state (like program counter and the loop index variable) had been saved at the time of interruption.

Figure 3:
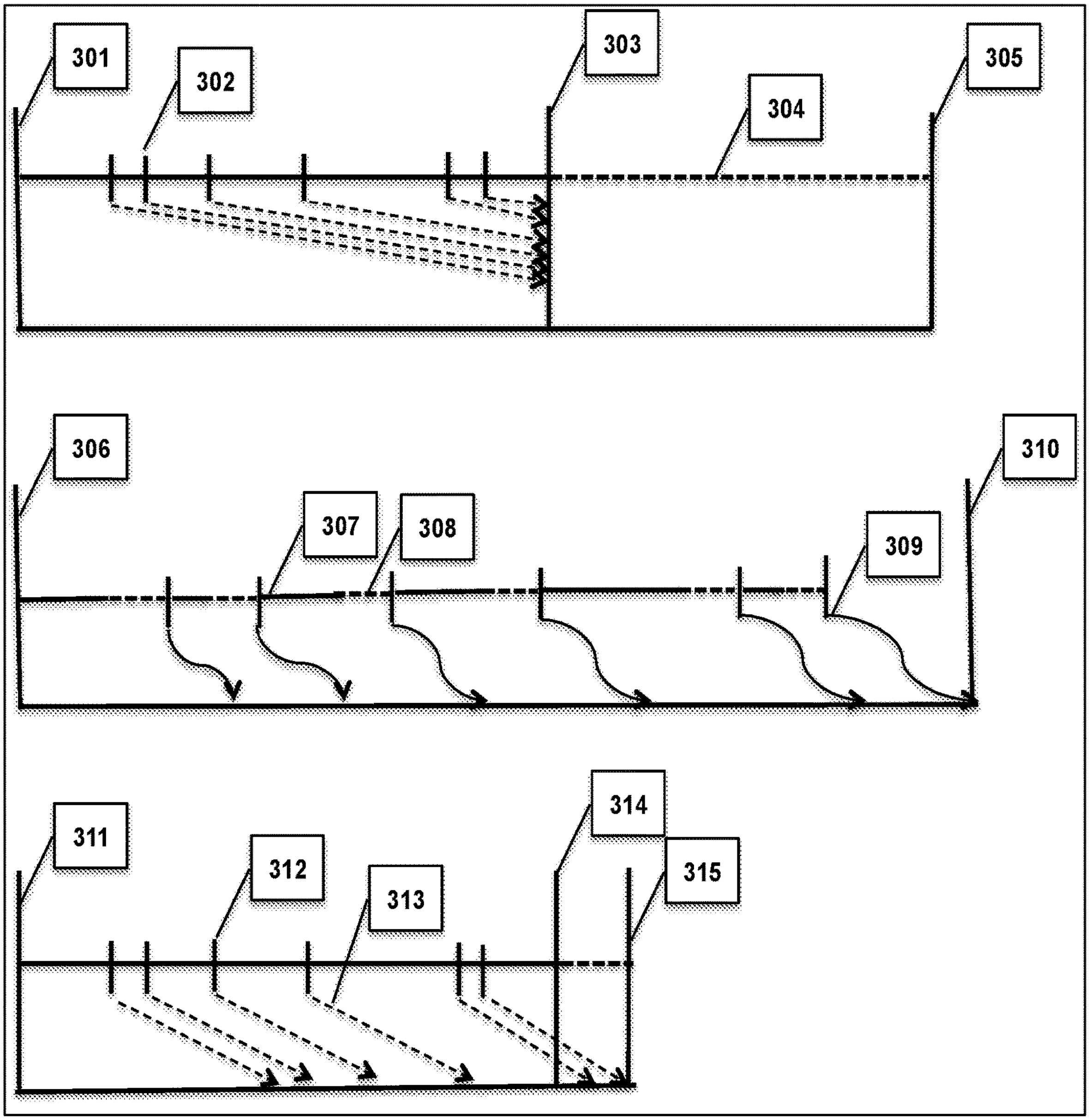
FIG. 3 is a diagram showing the comparison in performance between asynchronous writes to persistent memory and synchronous techniques such as copy-on-write and a non-atomic method.

FIG. 3 depicts several ways in which a transaction containing a group of stores can be written to memory. The tall lines 301, 306, and 311 on the left denote a transaction start. Writes are shown as small vertical lines 302, 307, and 312, lines 303, 309, and 314 denote a commit, and the transaction ends and is present in persistent memory at times 305, 310, and 315.

The first transaction 301, shows a typical transaction that suspends all writes until a commit. This method incurs a large number of write operations all at once after a commit is issued at time 303. The large number of writes to persistent memory can fill up write buffers, especially when the write delays are long in the case of persistent memory, and this can significantly affect performance. It is important to note that this large delay could be avoided if the write was performed asynchronously. In addition, the Write Storm 304 must be atomic to persist in persistent memory as described above or the state of the system will be inconsistent.

The second transaction 306, shows an Undo Log approach that requires copying of old values and placing them in a persistent memory based log structure before a write is made. This synchronous copy operation 308 also incurs extra long delays, as each log entry must be flushed to persistent memory to preserve ordering and consistency.

A more efficient approach is shown in transaction 311 where a transaction lets writes proceed asynchronously 313 without stalling, and at the end of the transaction time 315, only the remaining outstanding memory writes are flushed to persistent memory. Using background writes this approach avoids the synchronous delays incurred by waiting for writes to proceed while allowing for operations in a thread to continue. However, there are problems to be addressed to ensure the consistency of the data in that open writes must still be atomic and the transaction durable.

FIG. 5 shows an atomic persistent region annotated by a programmer. The start of the atomic region is denoted by wrap_open and the end of the atomic region is denoted by wrap_close. A number of persistent memory operations are included within the start and end markers including updating a single variable and an array of integer values. The program comprises a single atomic region using two static persistent variables x and p and a dynamically allocated region of persistent memory obtained by a call to p_malloc, a persistent memory allocator similar to the usual malloc function. The programmer identifies the atomic region by demarcating it between wrap_open and wrap_close tags. The preprocessor translates accesses to persistent memory within the atomic region to calls into a library that provides the atomicity as shown in FIG. 6.

One method to update the group of persistent memory locations atomically is to convert, either manually or by compiler assistance, the persistent memory operations to a series of procedural calls as shown in FIG. 6 and will be described in detail later.

Figure 7:
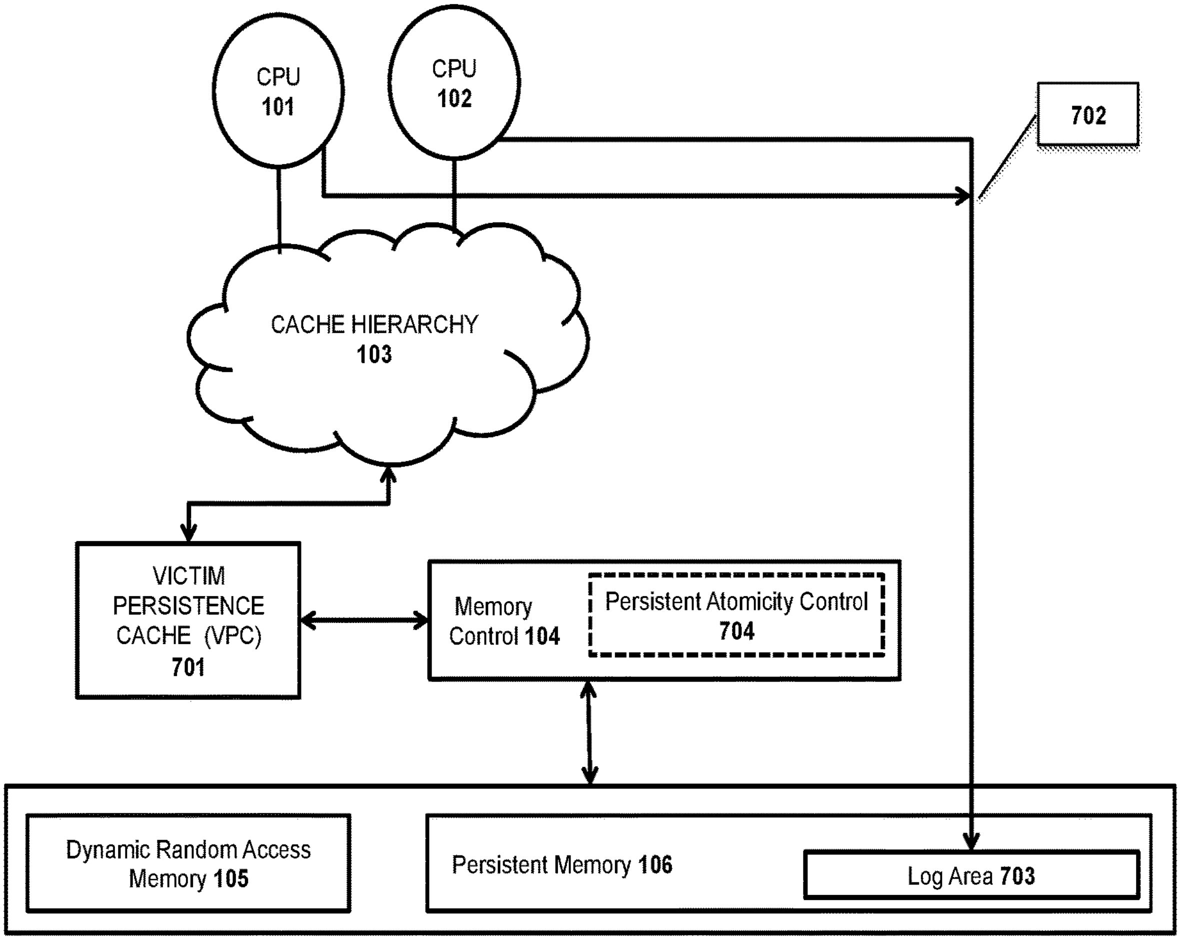
FIG. 7 is a diagram illustrating exemplary computer architecture of a processor, cache, and memory area with persistent memory, victim cache, and persistent atomicity control.

In an embodiment with hardware support as shown in FIG. 7, a group of persistent memory operations can be performed atomically by capturing all persistent memory evictions from the cache hierarchy 103 into a Victim Persistence Cache (VPC) 701, logging all writes to a Log Area 703 in persistent memory 105 along a fast path through the processor 702 (or through streaming store or normal store operations), and adding persistent atomicity control 704 to the memory control. Alternatively, the persistent atomicity control 704 may be implemented with additional software routines to fetch victim persistence cache 701 sizes and explicitly expire entries in the victim persistence cache 701.

Still referring to FIG. 7, a WrAP, or Write-Aside-Persistence, is a transaction mechanism that controls the writing of variables to persistent memory in an atomic manner. The WrAP approach relies on a few changes to the system processor architecture as shown in FIG. 7. Other techniques also require architecture support such as BPFS and NV-Heaps. However, these techniques require up-front changes to the cache line and architecture by adding tags, counters, and boundaries.

A WrAP has several different functions: it acts as a lightweight firewall that prevents arbitrary writes to persistent memory; provides an ordered log of all updates to persistent memory made by transactions, permitting rollback or recovery in case of process or system failures; and provides a non-intrusive interface for interaction between the cache system and persistent memory while permitting relatively independent operations. Changes to protected areas of persistent memory are only possible through a WrAP operation. Like a file system that protects a storage device from arbitrary updates, a WrAP orchestrates all changes to persistent memory.

Now referring to the Persistent Atomicity Control 704, when a thread opens a WrAP it obtains a token from the control, similar to a file pointer, and uses the token to identify atomic updates to persistent memory variables (which are not persisted until the thread issues a wrap close operation). Writes to persistent memory within a WrAP are treated normally in that they are written to the cache using normal store instructions. However, the write is also simultaneously placed in the backend buffer to be entered into the Log 703. The updates to an entry in the cache 103 via a persistent write must be prevented from being written to persistent memory 106 until the transaction commits or persistent memory might not be consistent on a system crash. When the transaction commits, only a small delay is required to ensure that any remaining entries are flushed to the Log 703.

The WrAP Architecture not only protects persistent memory from uncommitted writes, but it also creates an ordered log for durable recovery in case of a system crash. It also allows for utilizing the system cache hierarchy for increased transaction speeds while only requiring a few small changes to the processor architecture.

Still referring to FIG. 7, the Victim Persistence Cache (VPC) 701 traps all cache evictions of any persistent store operation managed by a WrAP transaction. It serves as the store for the evicted variable until the WrAP is closed, at which time the entries can be marked for removal. If an evicted persistent variable was allowed to proceed to be written to memory, then persistent memory 106 might not be consistent in the case of a system crash.

Once a variable is marked for removal on a WrAP close, it can continue to persist in the VPC 701 as long as there is space. Deletions from the VPC 701 can be handled by the controller in the background, but must be flushed to persistent memory 106 to ensure consistency in subsequent accesses to the variable. When the Log 701 is being written to persistent memory 106, it can remove any associated entries from the VPC 701 to avoid double writes. After removal, subsequent read or write operations are handled normally, first fetching the variable from persistent memory 106.

The VPC 701 can be modeled and sized effectively so that an overflow is a rare event. If an overflow happens to occur, then the Persistent Atomicity Control 704 can switch to a state that searches the Log entries for variables in a wrap operation that incur a cache miss. The VPC 701 may also be implemented in DRAM since its entries are already preserved in the Log structure, so it can be sized appropriately and even implemented in software.

On a persistent WrAP write operation, a value is not only written to the cache hierarchy 103, but it is also written to the Log 703 via a backend buffer 702. The write may be implemented as special hardware buffer, a direct write to persistent memory with a flush and fence, or a streaming store operation and fence. The embodiment is a buffer to direct write to the Log 702.

Figure 8:
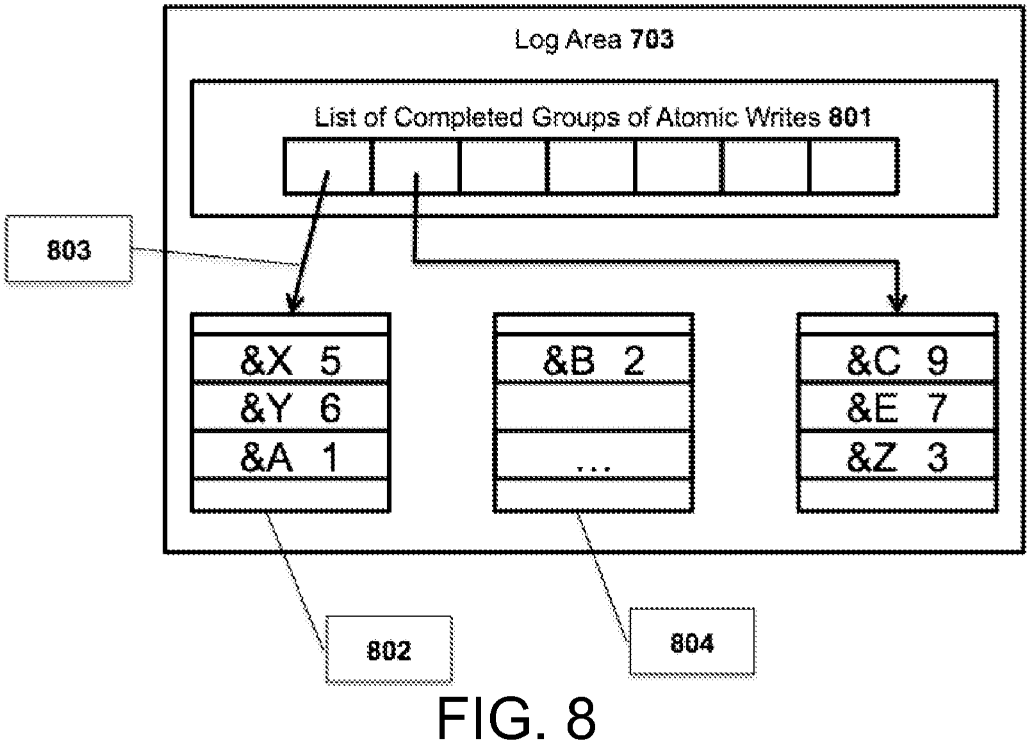
FIG. 8 is a block diagram illustrating an exemplary log area of persistent memory with two closed logs of groups of atomic writes and one open log.

Now referring to FIG. 8. The Log 703 is comprised of a contiguous region of key and value pairs placed in buckets 802 and 804 that contain the persistent memory address to update and the value to be written. The hardware can take advantage of many of the techniques to reduce write traffic such as write coalescing and thresholding. When a WrAP is opened, the persistent atomicity control 704 allocates a bucket in the Log area. On a WrAP close, the bucket 802 is atomically marked as complete and can be scheduled to update to persistent memory. Periodically, the persistent atomicity control 704 takes completed buckets and copies its entries into persistent memory. While doing so, it checks the VPC 701 for any duplicate entries and values and proceeds to safely remove the VPC entry.

To recover from a system crash, the Log 703 is sequentially processed. All completed buckets 802, which correspond to completed and closed WrAPs, are then copied to persistent memory by writing the value into the persistent memory address. Any incomplete buckets are not copied to persistent memory, as the WrAP was not closed and complete. Since none of the variables are written to persistent memory during a WrAP operation until a WrAP close, a failed transaction will not cause the system to be in an inconsistent state after a recovery.

A log record is a key and value pair, consisting of the memory address that the transaction is updating and the value being written. Log records are write-once records used only for logging purposes. Hence, they are not constrained by memory consistency requirements and do not benefit by caching.

In addition, while the underlying writes may be to scattered persistent memory addresses, the log records of an atomic region will all be stored contiguously in a bucket 802 and 803 associated with this WrAP. This makes them ideal candidates for using the non-cached write-combining modes present in many modern processors (referred to as non-temporal writes). This mode bypasses the cache on stores and uses a write buffer to combine writes in a cache line before flushing the buffer to memory, greatly speeding up sequential writes. When the transaction commits, the log pointer 803 is added to the list of completed groups of atomic writes 801, and a single persistent fence operation is needed to make sure that any remaining log records have been written out to the corresponding bucket.

A thread will do a WrAP write when it needs to update persistent storage in an atomic manner. At the start of an atomic region, the thread opens a WrAP and obtains a token, which is used to uniquely identify this WrAP. Writes within the atomic region result in two actions: a WrAP record is created to log this update (similar to a redo log record) and write it to a reserved area in the Log structure allocated by the WrAP. Simultaneously, a normal store instruction to the persistent memory address is issued. At the end of the atomic region the thread closes the WrAP.

When a WrAP is opened, it is allocated a bucket 804 in the Log area 703. A bucket implements a Key-Value store to hold the log records being written in that atomic region. The figure shows three buckets. Of these, 804 is a log entry for a WrAP that is currently open. Bucket 803 belongs to a WrAP that has already closed. No new records will be added to a closed WrAP. When a WrAP closes, it is added to a list of completed WrAPs or groups of atomic writes 801, which is a circular First-In-First-Out queue.

Methods to implement a robust Log in the presence of failures are many, and the invention can easily adapt those log structures. Entries in completed logs are periodically processed and deleted after the associated updates are made persistent. Note that a transaction is allowed to complete only after its bucket has been added to the list of completed groups of atomic writes 801.

As mentioned earlier, the actual persistent memory locations referenced by a write operation (called home locations) are not updated immediately. A copy is made in the cache in order to facilitate normal program functioning, and a log record carries the new value to the log bucket associated with the WrAP. The Persistent Atomicity Control 704 will make the update to the home locations independently. It operates as a background task that is periodically invoked to trim the log. It operates on the Log entries from the list of completed groups of atomic writes 801 in order from the head towards the tail.

The frequency of invocation of processing completed entries is constrained by the space available in the VPC 701. If too many items belonging to closed transactions remain in the VPC 701 it may overflow. These items may be deleted when copying from the log to the persistent memory location. It should be deleted only if the copying is being done by the most recent transaction. It may also be deleted if it has the same value in the log as that in the VPC 701. In this case, the item in the VPC 701 can be safely deleted, even if it is not the last transaction that wrote it. This can happen if two transactions wrote the same value to the variable. In this case, the premature deletion of the entry in VPC 701 is unnecessary, but can cause no harm.

On restart and recovery, all completed logs in the list of completed groups of atomic writes 801 are copied to their home persistent memory location. Additionally, all entries in the VPC 701 are flushed. In fact, since the VPC 701 may be implemented in volatile DRAM 105, its contents may have been lost in the system crash anyway. Note that partially written buckets that were not attached to the Log at the time of system crash can be safely discarded, since their transactions are treated as not having completed. Of course, none of the variables that these transactions wrote have had their home locations updated either. Finally, employing a robust, yet lightweight, implementation of the Log ensures that a failure that occurs during the update of the Log while an entry is added can be detected.

In a software embodiment, a wrap_open library function returns a token, an integer identifying the atomic region. Each open atomic region (also referred to as a WrAP) has a unique identifier. Stores to persistent memory within a WrAP are redirected to the library via the wrapStore call. The call can take three arguments: the WrAP identifier, the address of the persistent memory location being written, and the value being stored. In the simplest version every store to a persistent location within a WrAP are redirected through the library. Compiler optimizations may be used to reduce this overhead using memorization or static in-lining of code.

Now referring to FIG. 6, there are three such persistent store statements identified by wrapStore calls. These are used for x, the pointer to the unnamed array allocated by p_malloc, and the accesses to the array p elements themselves within the for-loop. At the end of the atomic region the library function wrap_close is called to complete the wrap operations and ensure that critical store values have been safely committed to persistent memory.

A classic method of providing ACID guarantees in transaction management systems is the use of an undo log. In this approach, some variant of a copy-on-write mechanism is used to create a copy of an object in an undo log, before updates are applied to it. In case the transaction aborts or there is a system failure before all the updated values are committed to durable storage, then the system is rolled back to the instant before the start of the transaction using the original values in the undo log.

FIG. 10 describes in pseudo-code an implementation of a WrAP using an undo log. A persistent store within a wrap invokes wrapStore as described previously. The routine first reads the current value of the variable and records its value along with its persistent memory address in an undo log. The persistent memory address corresponding to the virtual address addr of the mapped object is denoted by $\phi$ (addr). The log record needs to be committed to persistent memory before the store of the new value can be allowed to proceed. This is shown by the P_MSYNC call that is used to force all pending stores (and loads) to complete before execution continues. While similar in spirit to the common fence instruction MFENCE provided for memory synchronization in modern processors, P_MSYNC also provides a persistence guarantee; that is, all pending stores will have been committed to memory and not merely made visible to other processors using the coherence mechanism. Note there is no benefit to writing the log record to the cache since it is simply written once. Instead, we use streaming non-temporal store instructions for this purpose. These instructions bypass the cache and also employ write combining, which can be used to optimize the sequential write usage of the undo log.

The P_MSYNC instruction is necessary to force the log contents in the write buffer to persistent memory. Finally, the new value is written to the memory address in the cache in write through mode to allow the update to asynchronously trickle to persistent memory. When the wrap is closed, the program must ensure that all the updated values have reached persistent memory, which is accomplished using a P_MSYNC. In the absence of a write through mode, the updated values must be explicitly flushed and written back from the cache as discussed below. Some architectures support a regular memory sync or memory fence or store fence to persist memory values into PM.

As noted above, the virtual addresses generated by the program need to be mapped to their physical persistent memory addresses and recorded in the undo log; otherwise their id can be lost along with the page tables in a system crash. Knowing the base address of an object's map and the accessing memory through an offset allows for a simple implementation of the mapping, without involving operating system intervention.

The second point is the potential performance impact due to many synchronous memory operations. Each updated variable needs to be read and a log record with the old value must be synchronously written to persistent memory, before it can be updated. Also, the new value needs to be written to persistent memory before the transaction is committed. If the updates are cached in write-through mode the updated values can be committed to persistent memory while retaining their cache accessibility. In a write back-cache the updates need to be explicitly flushed from cache (using the CLFLUSH instruction for instance) and then persisted to memory. Note that CLFLUSH actually invalidates the corresponding cache line as well, which is undesirable since the updated values may still be needed within this transaction or by later transactions. Deferring the flushes to the end creates a write storm of updated values being written to persistent memory. Hence while CLFLUSH will work correctly performance may be an issue.

Figure 9:
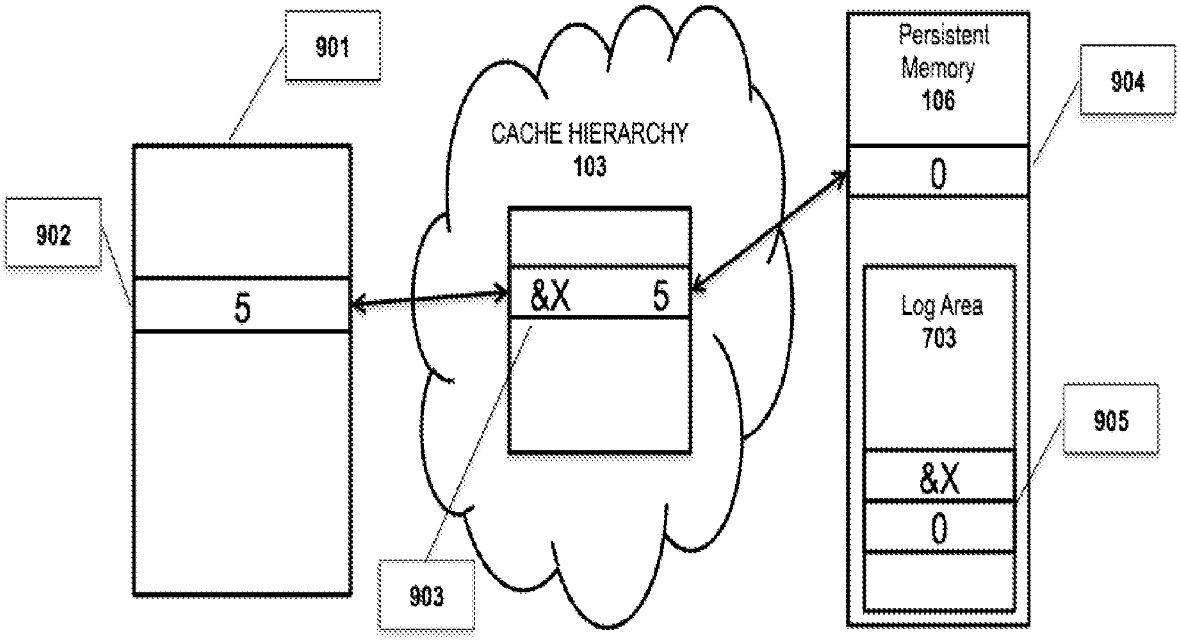
FIG. 9 is a block diagram illustrating a copy-on-write approach to persistence with the user address space, cache hierarchy, and persistent memory with an example value.

FIG. 9 depicts the copy-on-write approach. A persistent user space 901 variable X in a location denoted by 902 with value five is cached in the cache hierarchy 103 in entry 903. On a cache eviction to persistent memory location 904, the value of X, will overwrite the previous value of zero. A copy-on-write log located in a persistent memory 106 log area 703, copies the address of X, and its current value of zero to the Log in entry 905. In case of transaction abort or system failure, the old value of X can be restored to zero if it had been overwritten due to cache eviction to 904. Note that at the end of the transaction before the Log Area 703 can be cleaned, all variables must be copied or flushed from the cache hierarchy 103 to persistent memory 106.

In an embodiment of the present invention, an alias method provides a more efficient approach. We describe here a software approach that does not reply on new hardware features, but which can be adapted to utilize new hardware mechanisms that may become available.

The invention involves simultaneously propagating transactional updates along two paths: a foreground path through the cache hierarchy that is used for communication within and across transactions, and a slower asynchronous path to persistent memory. The latter path is used to create a redo log that records the new values for all updated memory locations. However, the writes to the redo log can be done asynchronously with respect to the rest of the transaction; the only requirement is that they be made persistent before the transaction ends. In contrast, each record of the undo log had to be made persistent before the corresponding memory location was updated.

Implementing the foreground path correctly without hardware support can be tricky. The problem is that spurious cache evictions (described previously) must be prevented from updating the locations in persistent memory. Previously, a hardware solution to this problem has been presented based on the idea of a Victim Persistent Cache that fielded persistent memory locations evicted from the last-level cache. In a pure software approach of the present invention, we instead employ aliasing to redirect these updates to a different location where they can do no harm.

FIG. 15 presents pseudo-code of the aliasing approach in a pure software atomic grouping of writes to persistent memory. When a persistent location is updated for the first time it is entered into a key-value store (that may be implemented as a simple hash map table) that maps the virtual address X to a different address X', and is backed up by a physical DRAM location. All wrapped accesses to X are redirected to address X' by looking up the table; reads and writes are done from location X0 which will be cached. If evicted, the evicted value updates the shadow DRAM location ϕ (X') rather than the persistent home location ϕ (X). Thus transactional communication takes place via the cache hierarchy suing the aliased location (primed variables) while the record of updates is streamed to persistent memory asynchronously and concurrently in the form of redo log records.

In another embodiment, an alternative to creating aliases in DRAM, an alias is instead simply to their copy in the redo log record. This saves memory space by avoiding the extra DRAM copy, but requires the redo log records to go through the cache hierarchy. Evictions and cache misses would then need to access slower persistent memory rather than DRAM, which could potentially cause performance issues when the cache pressure is high. In the latter approach, the aliased location will change as different transactions access the variable and alias it to their private log locations. Frequent updates will cause increased coherency traffic, as hash tales entries are repeatedly invalidated, in contrast to the DRAM-based solution where the alias addresses do not change till the corresponding entry is deleted.

To keep the size of the alias memory bounded, the backing space needs to be de-allocated periodically. This can be safely done once the latest value of a variable has been copied from the corresponding redo log to its home location. Care is needed to avoid inconsistencies in alias address when multiple concurrent threads access the same variable; the details depend on the semantics of the isolation modes that are supported. For instance, under strict serializability one can show that there will be no races in accessing the hash map entries. Relaxed isolation modes will provide non-deterministic but consistent semantics. A final consideration concerns the mapping of a shared persistent object in the address space of multiple threads. One implementation can have a fixed mapping based on common agreement, in preference to more costly dynamic alias conflict handling mechanisms or include a the dynamic alias conflict handling depending on application speeds.

Figure 11:
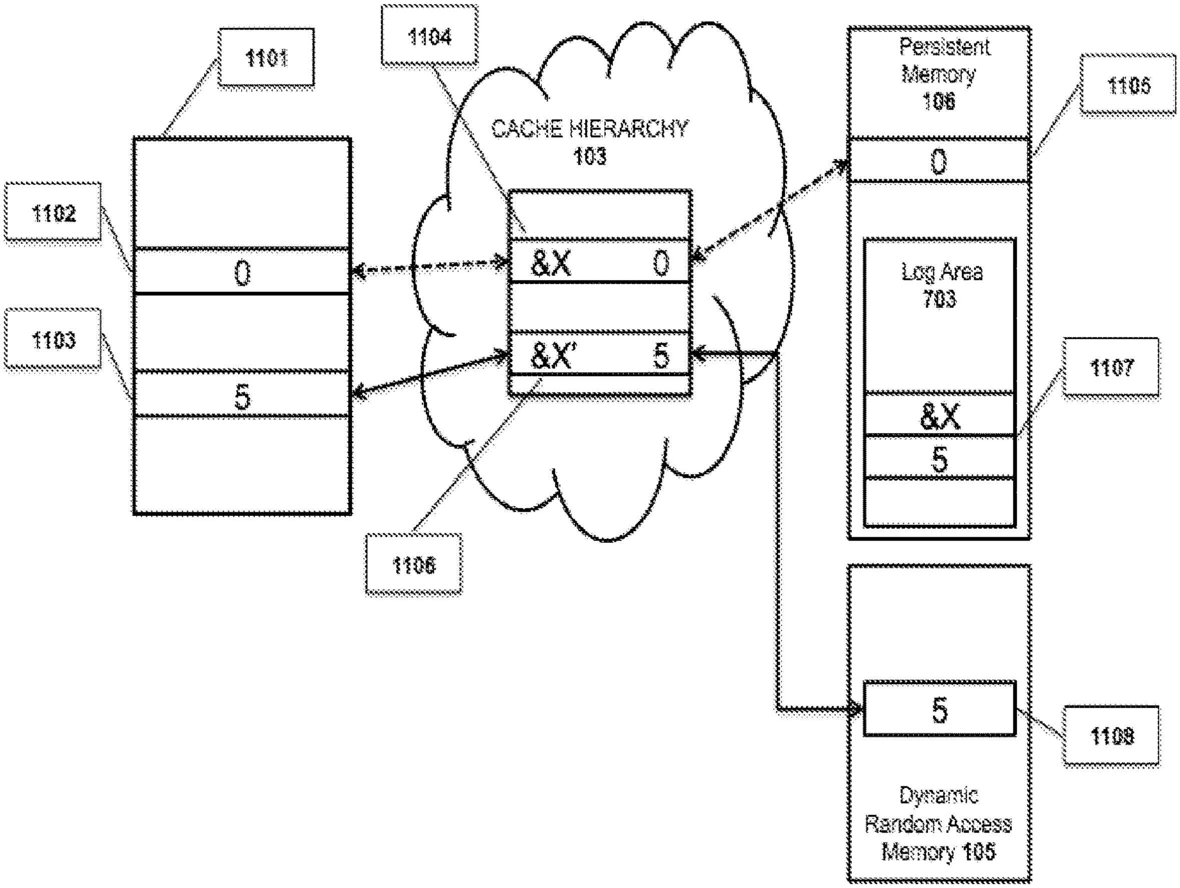
FIG. 11 is a block diagram illustrating an alias update or write-aside approach to persistence with example values in user address space, cache hierarchy, persistent memory, and Dynamic Random Access Memory.

Now referring to FIG. 11, an alias example is shown for a persistent variable with virtual address 1102 in virtual space 1101 and physical persistent address &X, 1105, with initial value 0 in cache entry 1104. When a value 5 is written to X, the cached value 5 is backed by a DRAM address 1108 corresponding to the aliased address X' 1103 in user space and cache line 1106. The Log 703 stores a copy of the new value as the record (ϕ (X); 5) 1107. Note that in the alternative implementation ϕ (X') could be the address of the log record.

Figure 12:
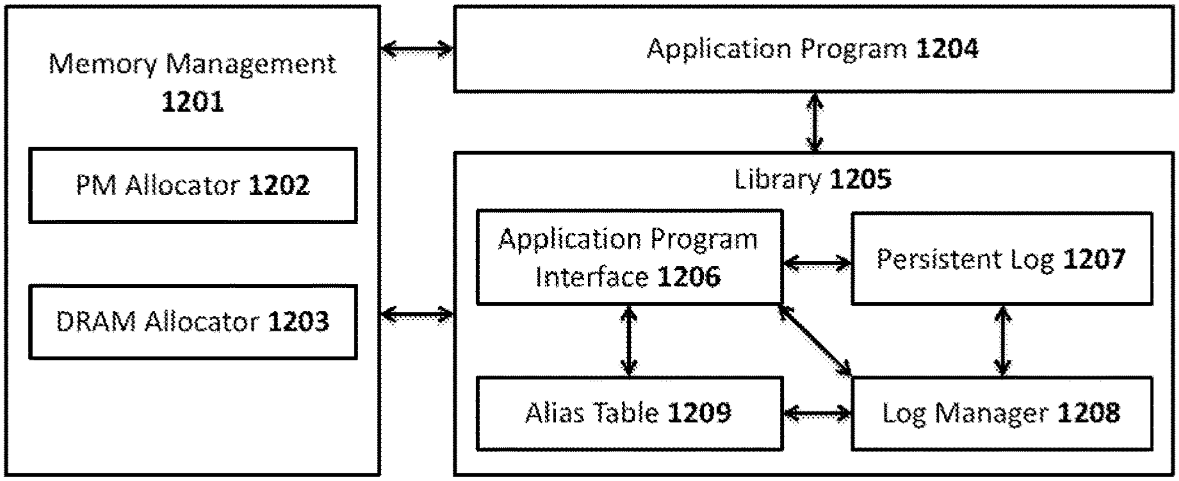
FIG. 12 is a block diagram illustrating an exemplary system with DRAM and PM allocators, an alias table, persistent log and manager, and application program and interface.

In an embodiment, now referring to FIG. 12, a system of components is shown supporting the atomic grouping of persistent memory writes. An Application Program 1204 is running on one or more CPUs 101 with persistent memory 106, a cache hierarchy 103, memory control 104, and Dynamic Random Access Memory 105. The Application Program 1204 needs to make an atomic group of updates to persistent memory. It utilizes a software library 1205 to perform the update. The memory may be updated through Memory Management routines 1201 using persistent memory in an PM allocator 1202 and optionally through temporary data in a DRAM Allocator 1203. The allocators may be included in a single allocator in some instances. The Library 1205 implements atomic persistence for groups of persistent memory operations. An Alias Table 1209 is implemented in DRAM and is accessed by the Application Program Interface 1206. The Persistent Log 1207 receives address location and values on memory write operations. Writes to the log may be performed using streaming or non-temporal store operations and may benefit from write combining. A Log Manager 1208 may read from the persistent log, be invoked by the application program interface and update the Alias Table. The Alias Table 1209 may be a hash table in DRAM or any lookup structure. For multi-threaded support it has a fine-grained locking structure or a lock-free method may be used. On close operations the Log Manager 1208 cleans up the Persistent Log 1207. The log manager may be invoked synchronously on a close, or invoked asynchronously when space in the Alias Table 1209 is running low. On aborts, the Alias Table 1209 should be flushed and all completed logs processed by the Log Manager 1208. On writing new values, an alias is first check for, and if not present created. Data is streamed to the log and the alias updated. On a read, if an alias exists, the alias is used; otherwise the original value is use. On using objects, an alias may be a pointer to a data structure instead of a primitive value such that arbitrary sized data may be persisted atomically. If arbitrary data sizes are implemented, then the size of the data needs to be present in the log.

Figure 13:
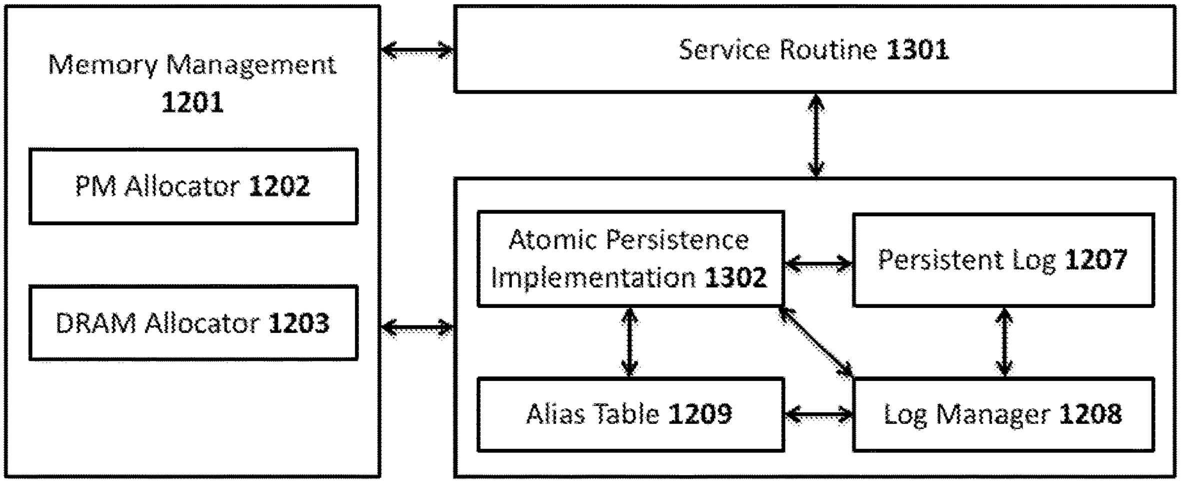
FIG. 13 is a block diagram illustrating an exemplary system with DRAM and PM allocators, an alias table, persistent log and manager, service routine, and an atomic persistence implementation.

Now referring to FIG. 13. Similar to FIG. 12, except that a service routine 1301 is being executed on a CPU 101. The same components are as described previously in FIG. 12. The service routine 1301 need not have a direct application program interface, but rather operate directly with an Atomic Persistence Implementation 1302 that interacts with the Alias Table 1209, Persistent Log 1207, and Log Manager 1208 as noted above.

Also note that the Alias Table can contain a single entry for a single variable. In an embodiment of a class-based implementation, variables contain their own alias.

Figure 14:
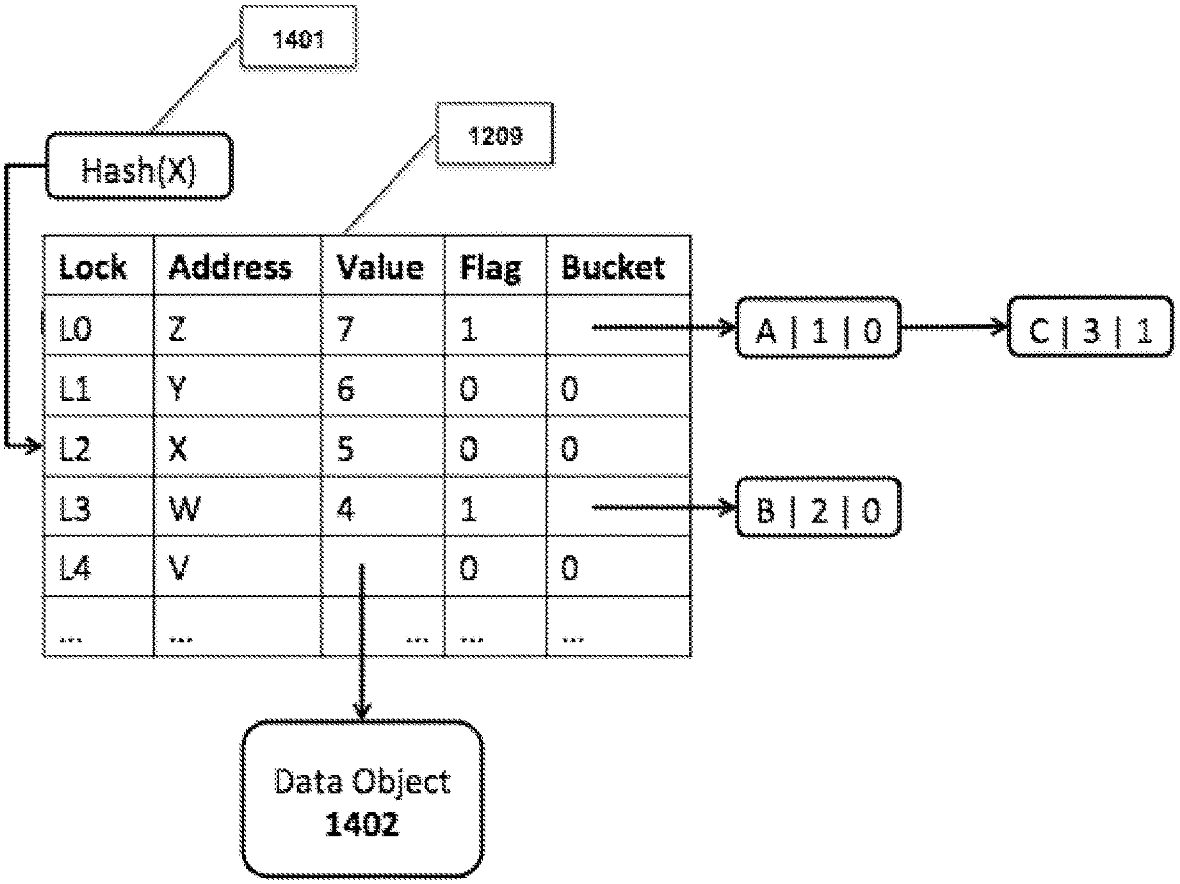
FIG. 14 is a block diagram illustrating an exemplary alias table with a fine-grained hash table, hash lookup and both object and primitive data values.

Now referring to FIG. 14, an exemplary Alias Table 1209 is shown. It is implemented using fine-grained locking with bucket pointers. A hash 1401 into the table is calculated for a variable X with value 5. It obtains a lock L2 that can be a read and write lock or any type of lock. Data Object 1402 can also be implemented in the table as the value in the Alias Table 1209 is a pointer to an object. If an entry already exists, a chain of similarly hashed address may be built. Flags and other values may be stored in this example table as well. Note that a pluggable Alias Table implementation may also be provided so that users can implement their own table as desired.

In another embodiment, the atomic group of persistent memory operations, on start of a group, can check for the presence of specialized hardware and if present invoke the hardware to perform the routine of atomic, persistent and durable writes to persistent memory using the VPC, specialized control, and memory writes as described previously. If the hardware is not present, then it can revert to using the software methods described above. Any mechanism known in the art for checking for the presence of the hardware support may be utilized.

Extending the Hardware Support

Figures 16, 17:
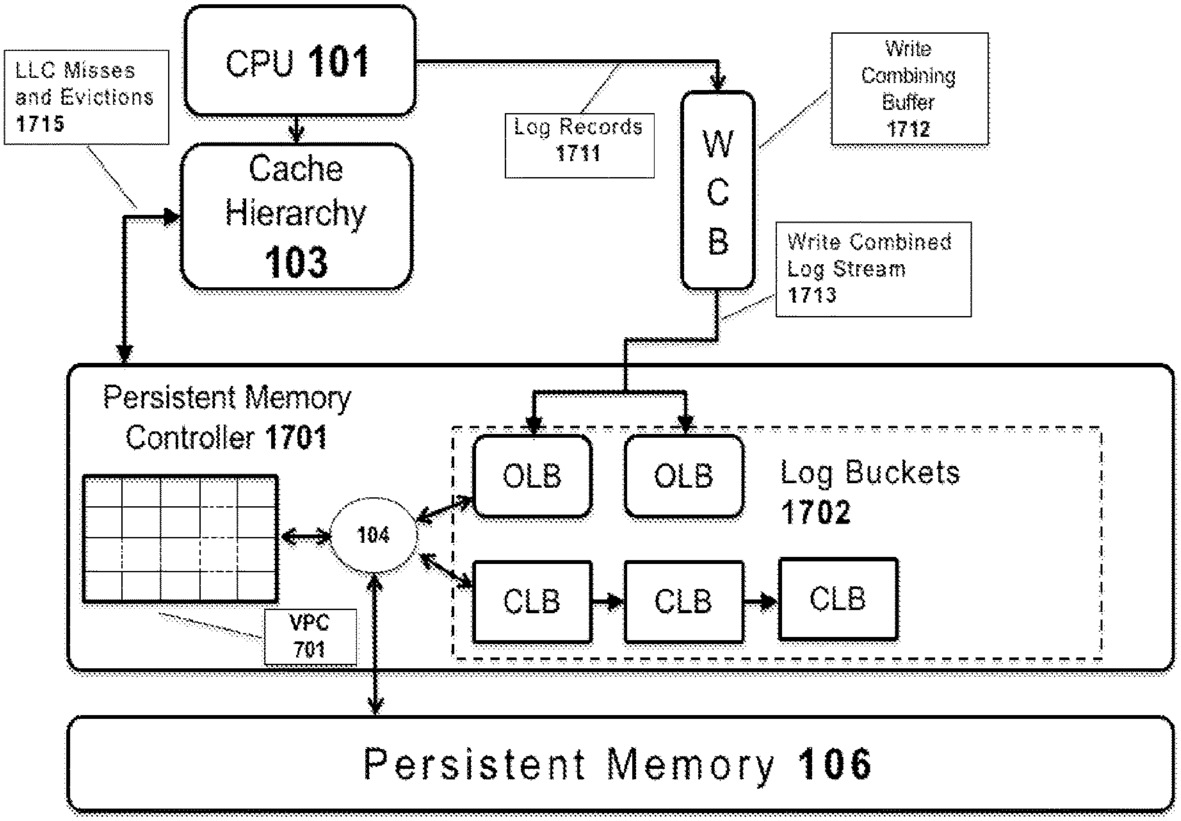
FIG. 16 is an example code fragment that shows a programmer annotated failure atomic region and a wrap equivalent durable atomic section of code.
FIG. 17 shows a Persistent Memory Controller that intercepts cache misses and evictions and processes log records in open and closed buckets; log records must be in PM while victim cache can be volatile.

FIG. 17 shows the logical organization of the hardware. A backend controller 1701 intercepts cache misses and evictions to persistent memory as shown in the left of the figure. Evicted cache lines from a CPU 101 and Cache Hierarchy 103 are held by the controller in a (volatile) victim cache 701 and prevented from directly updating PM 106. Instead, the home locations of persistent variables are updated asynchronously from log records in Log Buckets 1702 streamed to a persistent log area using compact, write-combined streaming stores. Log Records 1711 are stream from the CPU 101 through Write Combining Buffer 1712 for a write-combined log stream record 1713 to the Log Bucket Area 1702. Victim persistence cache 701 entries are deleted only after their updates have been reflected in persistent memory by log retirement. In the meanwhile, processor misses for these cache lines are served from the victim cache. The log itself is continuously pruned as its records are copied to persistent memory. We describe a simple protocol, which guarantees that the combination of victim persistence cache 701 and PM 106 never returns stale values, and that log records do not have to be searched to locate the most recent update. On a power failure it is safe to lose the contents of the victim cache. The log records will be used on restart to bring persistent memory to a consistent and up-to-date state.

A software library complements the hardware controller described above. The software library bridges the programmer interface and the controller interface. The algorithm in FIG. 16 shows a pair of library calls, OpenWrap and CloseWrap, which are created from the programmer-annotated atomic begin and atomic_end directives. The region of code that is bracketed by OpenWrap and CloseWrap is a failure atomic region with all-or-nothing store semantics. We will refer to such a region as a wrap and the back-end Persistent Memory Controller 1701 of FIG. 17 as the PM controller.

When a wrap is opened, OpenWrap allocates a log bucket in a non-volatile memory area known to the PM controller. This is a sequential byte array that implements a redo log for the wrap. The redo log is a sequence of log records, one for each persistent memory store operation done within the wrap. A log record holds the address being updated and the updated value. Stores to persistent memory variables are "wrapped" by a call to the wrapStore library function as indicated on the right in the algorithm in FIG. 16. The wrapStore operation (a) writes to the specified persistent memory address (such as the addresses of x, y, or z) using a normal write-back instruction (e.g., an x86 MOV) and (b) appends a log record containing the pair, [address, new-value], to the wrap's log bucket. The processor does not need to wait for the log records to be written to persistent memory at this time. The new values written by the normal write instructions are communicated to later loads (such as the assignment z=x in FIG. 16) via the cache hierarchy just as non-persistent DRAM variables. However, unlike regular DRAM variables, the flow-back of the updates to their persistent memory home locations is through the logged records and not by write backs resulting from cache evictions. Instead, write backs of these variables are intercepted and stored in the victim cache until the updates are successfully retired to persistent memory from the log records.

The log records are written to the log bucket using write-combining streaming stores (e.g., using MOVNT in x86 architecture) that bypass the cache. At the point of CloseWrap, any pending log record writes together with an end-of-log marker are flushed to the log bucket using a persistent fence (like the x86 instruction sequence SFENCE, PCOMMIT). A sentinel bit in each log bucket record ensures that any torn writes in the log bucket sequence can be detected, without additional fences to correctly order the write of the end-of-log marker. This log flush is the only one synchronous operation required per wrap in our protocol. Since the log bucket is a sequential array, write combining is very effective in reducing the time required to record the updates, in contrast to directly updating the scattered persistent memory addresses of the variables being updated.

An anonymous wrap that writes a singleton log record optimizes transactional stores of single variables, whose atomicity is guaranteed by the hardware, by fusing the library operations OpenWrap, WrapStore, and CloseWrap of one wrapped write. Further, any streaming (non-temporal) writes to PM are considered as controller bypassing writes.

Different processors may safely update different fields in the same cache-line; PM updates are only made from logged field values, while the victim cache behaves as an extension of the normal cache hierarchy. This avoids the complexities that arise when, for instance, two variables that share the same cache line are updated by separate transactions, one of which completes but the other aborts.

Wraps may nest if the programmer chooses, and the default semantic is to flatten the individual wraps contained within the outermost wrap, so that the outermost OpenWrap-CloseWrap pair defines the single failure-atomic sequence.

Since the wrap library API calls are done independently of the cache operations, a protocol is necessary to coordinate the retirement of log records and the operations of the victim cache, while ensuring recoverability from unexpected failures. In the next section we describe such a solution along with two different implementations for the controller.

Persistent Memory Controller

The Persistent Memory Controller ensures that the victim cache appears as a transparent additional caching level; behind-the scenes it enforces safety in the retirement of updates to PM and continuously prunes and retires the log. We first describe the high-level operation of the Persistent Memory Controller as shown in FIG. 18. We follow this with two implementation choices: controller using hardware or controller based on firmware.

The Persistent Memory controller handles two operations originating from the processor cache: CacheEvict in response to a cache eviction and CacheMiss in response to a cache miss. It also supports the operations HandleOpenWrap and HandleCloseWrap invoked from the Wrap software OpenWrap and CloseWrap functions. The controller invokes the RetireWrap controller routine internally to update home locations of closed wrap buckets.

Each open wrap has a wrap id (a small recycled integer). The controller keeps track of the wraps that have opened but not yet retired in the set variable openWraps, which is updated in HandleOpenWrap and RetireWrap controller functions. When a wrap closes, its log bucket is appended to the tail of a FIFO queue of closed log buckets pending retirement. The log records in these buckets are retired asynchronously with backend writes of updated data values into their persistent memory home locations (see RetireWrap).

A block B that is evicted from the processor cache is placed in the victim cache and tagged with its dependence set DSB. DSB is the set of wraps that were opened before B was evicted that have not yet retired. DSB is initialized with the value of openWraps at the time of its eviction; as wraps retire they are removed from DSB. The dependence set is used to determine when it is safe to delete a block from the victim cache.

Block B is deleted from the victim cache when its dependence set DB becomes empty. Suppose B was evicted at time t and was last written by wrap w. Then either w is not an element in DSB (w retired before t) or w is in DSB. If w is not in DSB, then all updates made to B (by w or earlier closing wraps) have already been written to PM and B can be safely deleted from the victim cache. On the other hand, if w is in DSB, then B may hold updates of a currently open wrap that have not yet been reflected in PM. Since we do not know which case holds, we conservatively assume that w is an element in DSB and keep B in the victim cache until DSB becomes empty.

We illustrate the controller operations using the example operation sequence of FIG. 19. The HandleOpenWrap calls at t=1 and 3 cause wrap ids 1 and 3 to be added to openWraps. When A is evicted at t=2, its dependence set DSA is set to {1}, the openWrap. Similarly, when B is evicted at t=4, it is tagged with DSB={1,3}. A cache-miss for A at t=5 is serviced from the victim cache but not deleted from it. Since it is possible for A to be subsequently replaced silently in the processor cache, the controller retains A in the victim cache. When A is again evicted at t=6, it is tagged with an updated dependence set DSA={1,3}. The previous version of A can be removed at this time. When wrap 3 closes, its log bucket is moved to the retire queue. At t=9, log bucket 3 is retired and removed from openWraps and the dependence sets of both A and B, resulting in DSA=DSB={1}. When log bucket 1 is retired at t=10 both A and B are left with empty dependence sets, and thus both can be safely deleted from the victim cache.

The novel Persistent Memory Controller ensures that if a persistent memory variable is found in the processor cache hierarchy then its value is that of its latest update. If it is not present in the cache hierarchy but is present in the victim cache then this is its latest value. If it is neither in the processor caches nor in the victim cache, then its persistent memory home location holds its latest value. Consequently, the Persistent Memory Controller does not have to search the log records at run time to find the value of a variable.

Handling Non-Transactional Stores

We now describe how to deal with mixed workloads consisting of both transactional writes and stores that are not part of any transaction. It is possible to simply treat the latter as singleton store transactions as discussed earlier, but this approach incurs unnecessary overheads for wrapping, logging and replay. Instead we alter the PM Controller protocol to write these variables that spill into the victim cache to PM. For these variables the controller simply acts as a pass through with delay. The controller must infer which entries in the victim cache can be discarded and which need to be written back to PM. We make a reasonable assumption that a cache line does not contain both transactional and ordinary variables. This allows the protocol to operate at the granularity of cache lines rather than individual words.

The modified protocol operates as follows. As each log record is written to PM during log retirement, we look up the victim cache for the address being written; if the corresponding block is found in the victim cache it is marked as clean. The update of the dependence sets proceeds normally without any change. However, when the dependence set of a block becomes empty, the block in the victim cache is simply marked as free but its contents are not deleted. When the controller needs to insert a block into the victim cache it looks for a free block as before. If the free block is also marked as clean the block can be overwritten by the incoming data; otherwise the current contents must be written back to PM before the block can be overwritten. The updated block is then marked as dirty. In some situations (if an eviction occurs after the log retirement of the last update) some transactional data may be written twice to PM, once from the log and once by write-back from the victim cache. However, the correctness invariant for transactional data still holds; further, in the absence of failure, all non-transactional data evicted into the victim cache will be eventually updated in PM.

Isolation Modes and Persistent Order

Memory models have been proposed that distinguish consistency orderings in volatile memory and persistence orderings in non-volatile memory. The former refers to the permissible orders for loads and stores during program execution, while persistence ordering refers to the order in which persistent memory locations are actually updated. The state of persistent memory following crash recovery reflects the persistent memory order. In our design, persistence ordering is defined by the order in which wraps are closed.

The permissible orderings of reads and writes in a multithreaded program are constrained by the transaction isolation mode (e.g. serializable, repeatable reads, read committed, read uncommitted) chosen for the application. Two transactions may serialize differently, depending on the chosen isolation mode. With the exception of read uncommitted, a transaction will hold all write locks for the duration of the transaction. Hence, program ordering seen by the threads and the persistence ordering enforced by the controller will be equivalent for these modes. For instance, in software fragment in FIG. 20, under the first three isolation modes the permitted outputs after both T1 and T2 have executed are (x=5; y=5) or (x=3; y=5). Since write locks are released only on transaction commit, persistence order will match execution order. In the case of uncommitted reads an additional possible output is (x=3; y=3). In this situation execution ordering may differ from persistence ordering (x=5; y=3) if T2 closes later than T1. The weak isolation mode trades off predictability for performance.

The Persistent Memory Controller Implementation in FIG. 18 may be implemented as a hardware structure or as firmware extensions to a memory controller. We describe both alternatives below.

In the hardware implementation of the controller, openWraps is maintained in a bit vector. Its size is a limit for the number of wraps simultaneously open at any time, and it is usually in the range of the number of CPUs. When a wrap opens, a bit in openWraps is set, and when it retires the bit is cleared. The victim cache is implemented as a modest set-associative structure in which each cache block maintains, in addition to the standard tag and data fields, an additional field for the block's dependence set whose width is that of openWraps. When the log bucket for a wrap is retired, the wrap id is broadcast to the victim cache and each block clears the retired id bit from its dependence set. If the bit vector representing the dependence set of a victim cache block becomes 0, the block can be deleted and reassigned.

Ordinarily, background log retirements prevent the victim cache from becoming saturated. On rare occasions, the number of active victim cache blocks (i.e., with non-empty dependence sets) may completely fill up a set and thus hinder the ability to handle further processor cache evictions. To decrease the chance of overflow, more space-efficient structures like a cuckoo hash table may be employed. Alternatively, we propose storing the entries overflowing the victim cache in a DRAM area managed by the controller firmware. If an entry cannot be placed in the victim cache, the controller adds it to a DRAM overflow area, which is searched when a processor cache miss is not satisfied in the victim cache. By appropriate sizing of the victim cache the probability of such an overflow can be reduced.

The above implementation of the Persistent Memory controller uses hardware-friendly components like associative search, broadcast, and highly parallel operations. An alternative approach is to use software-based search implemented by controller firmware using a DRAM victim cache as described next. The firmware can be used as an alternate implementation for the victim cache or may only serve as an overflow structure.

In a Firmware Implementation of the Controller, a hash-based key-value store (KVS) implements the victim cache. The key is the persistent memory address of the cache block and the value is the block data. The dependence set of a block is not stored in the KV store but in a separate FIFO queue (DFIFO).

On a CacheMiss the controller looks up the KVS to retrieve the data. On a CacheEvict, an entry is allocated at the tail of DFIFO and tagged with the current openWraps. The data is inserted into the KVS and a pointer to the KVS location is added to the new DFIFO entry. If there is an older version of the same block in the KVS we keep both versions in the firmware implementation. This enables quick deletion from the KVS when the dependence set for this block becomes null.

When a wrap retires it must be deleted from the dependence sets of all cached blocks. Without a broadcast, this would require a time-consuming scan of all the blocks every time. We avoid this by exploiting an inclusiveness property of dependence sets. Specifically, DFIFO becomes null in order from the head towards its tail. That is, if an entry in DFIFO has a null dependence set then so does every other entry that lies between it and the head. We combine this observation with a lazy update of the dependence sets to allow a constant time amortized deletion operation.

We keep a set of retired wraps and apply them only to the head entry of DFIFO. We advance to the next entry in DFIFO only when the dependence set of the head entry becomes null and the corresponding entry in the victim cache is deleted.

When a wrap retires, it is added to a set R and also removed from the dependence set of the head entry of DFIFO (if it is not in the dependence set, it is ignored). When the head entry has a null dependence set, its pointer into the KVS is followed and the block is deleted from the KVS. DFIFO is then walked towards the tail. At each entry, all wrap in R are removed from its dependence set, and if now null, the corresponding KVS entry is deleted. The walk continues until an entry with non-null dependency is found. This becomes the new head of the queue. If w is not in any dependence set at the time of its retirement it need not be placed in R. Due to the inclusiveness property, this only requires checking that w is not in the dependence set of the tail entry of DFIFO.

A wrap id w is recycled (and deleted from R) when no entry in DFIFO has w in its dependence set. This can be checked during the walk of DFIFO. If w is in the dependence set of the current but not the following entry in DFIFO (or this is the last entry) it can be recycled. Also to avoid unnecessary stalls due to the lazy release of wrap ids, it is sufficient to alternate between two versions for each wrap id, to achieve the effect of an unbounded number of wrap ids. Finally, a long running transaction can be handled by extending the KVS using system memory.

In the firmware implementation, the amortized time to delete a victim cache entry is O(1). The time to insert or lookup a block in the victim cache is constant with high probability due to the hash implementation of KVS. We note that the write traffic to the wrap controller (outside of evictions) occurs as compact write-combined log records, which are then written by the controller to the backend PM as scattered data writes. There is one write per log record though multiple writes to the same location within a log bucket can be combined with no effort.

In Software-based Write Aside Persistence, updates in an atomic region are made by simultaneously propagating writes along two paths: a foreground path through the cache hierarchy that is used for value communication within and between wraps, and an asynchronous background path to PM for recovery logging. In a global version, a shared, volatile alias table containing the most recent values is used for value communication between writers and readers. New values are entered into the alias table while being streamed to a PM based log. Post-transactional values are transferred to PM from the alias table and space for the associated entries and log are removed. By creating these two paths, SoftWrAP decouples transaction value communication from recovery logging. The decoupling of concurrency control (or transaction isolation) from failure atomicity allows persistence to be added flexibly to code that is already multi-threading safe.

The SoftWrAP approach has three logical components: logging, alias handling, and retirement. The logger maintains a sequential log in persistent memory that is updated using efficient, cache-line-combined streaming writes. The log is only used to recover from a crash. During normal operation the log is updated efficiently in an append-only fashion using cache-line combined writes, and periodically pruned by deleting entries of retired transactions (i.e. those whose updates have been retired to their home persistent memory locations). To handle the problem of spurious cache, SoftWrAP employs a software aliasing mechanism. This redirects updates to persistent memory locations by wrapStore to stores to locations in a managed area of DRAM referred to as the shadow DRAM. The stores to shadow DRAM allow the updates to be freely communicated via the cache hierarchy (as is done for normal variables) but uncontrolled cache evictions can do no harm. The retirement component copies the values of aliased variables from the shadow DRAM to the persistent memory home locations when it is safe to do so. This step is performed in the background, asynchronously and concurrently with foreground transactions. When a portion of shadow DRAM has been retired it can be reused, and all logs records from retired transactions can also be deleted.

Figure 23:
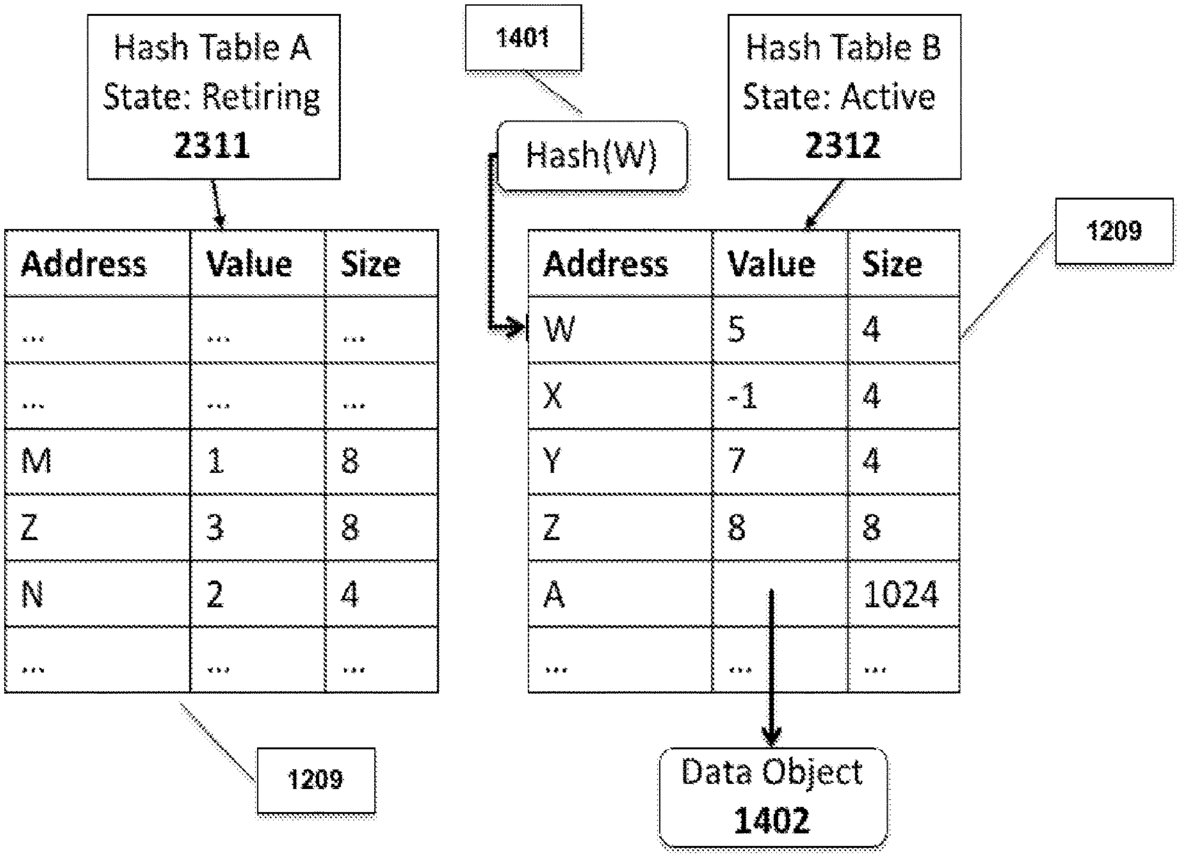
FIG. 23 is an example Alias Table implementation for global aliasing is a double-buffered lock-free hash table implementation, which handles reads and writes to both primitive data types and object data and can retire directly from the table.

FIGS. 10 and 15 present the Soft-WrAP library. The data structure to implement the alias table is a hash-table based Key-Value store. A non-blocking implementation is used to avoid excessive locking and unlocking when multiple threads access the table, as discussed later. For scalar variables, the alias table itself stores the latest value of the variable, while for large objects only the pointer to the copy of the object is stored in the alias table. FIG. 23 (see Hash Table A, 2311) shows scalar persistent variables M, Z, N with values 1, 3 and 2 respectively in the alias table along with a size qualifier. In Hash Table B 2312, object A 1402 (a 1K page) is stored in the alias table 1209 as a pointer to the shadow DRAM area where the copy of A is stored.

Wraps may be nested. For instance, an application may require that the insertion of an element into a B-tree data structure and the deletion of some other element to be performed transactionally by enclosing the operations in a wrap. The persistent B-tree operations may themselves need to be wrapped to maintain data structure integrity while multiple internal tree pointers are updated. The calling wrap may subsume nested wraps. Hence calls to wrapOpen and wrapClose increase and decrease the nesting level by 1 respectively. A wrapClose with nesting level 0 indicates the closing of the top-level wrap and requires the log to be made persistent in PM.

The SoftWrap API is shown in FIGS. 10 and 15. The outermost wrapOpen call registers a thread-specific handle to the alias table and to a RedoLog area allocated for the wrap. Subsequent nested calls by this thread are simply rolled up to its outermost call, since atomicity needs to be preserved at the outermost level. The wrapLoad and wrapStore calls are used for reading or writing scalar persistent variables within the wrap. The wrapStore inserts or updates an existing entry for the variable in the Alias Table with the new value being stored. It also appends a log record with the persistent memory address and value of the variable to the end of the redo log bucket for this thread.

Additionally, wrapRead and wrapWrite are used to read and write objects. This is useful for applications that read and write data in large extents. These objects are allocated space in the shadow DRAM and accessed indirectly via pointers in the alias table. To simplify space management and support legacy database applications, objects are broken up into units of fixed size pages (we use 1 KB pages but this is a tunable parameter), and one entry is maintained per page in the alias table. A wrapWrite whose destination spans multiple pages that have all been already inserted in the alias table simply updates the data pages in shadow DRAM. Otherwise, if the data size being written spans an entire page, it is written to a newly allocated DRAM page. The worst-case occurs if the new data spans only part of a newly allocated page. In this case the updated data needs to be merged with missing bytes from persistent memory. A record containing the new data being written is also appended to the redo log in persistent memory.

The alias table is the key data structure in SoftWrap and needs to be managed carefully for performance. In one embodiment, the alias table as a double-buffered hash table based key-value store that supports update and lookup operations. Entries are never deleted from the table so we do not need to support a delete operation. Instead, the entire hash table is recycled after the home PM locations of the variables are updated from the alias table. This permits a scan-based, thread-safe non-locking implementation that simplifies the design and improves the performance significantly. To lookup an address p, the table is scanned starting from the index computed by Hash(p) until either p is found or the scan encounters a blank entry in the table. In the first case an update operation can simply rewrite the value field of the existing entry. In the second case it must fill in the address (key) and value fields of the blank entry. A simple compare-and-swap test of the single entry just prior to the update is sufficient to prevent races. The table does not need to be locked nor does one need to lock extended code sequences.

The alias table may be implemented using any number of additional hash-tables for additional buffering. For instance, three hash tables could be used instead of two. In this case tables that still had current values in memory need be consulted on wrap read operations. Additional buffering can provide performance benefits for bursting write operations. Any number beyond three, such as four, five, or more to the limit of main memory may be implemented; it is in no way limiting in the number of tables. Alternatively, a list based approach for chaining tables and lookup methods can be supported.

The home locations in PM of written variables need to be updated to their updated values and the alias table memory freed for new entries. This retirement process could be performed either from the values in the logs or from the alias table. Retiring updates from the log requires reading the log and then writing to PM, while the latter approach can stream DRAM-resident data in the alias table to PM using efficient memory scatter instructions. We use alias table-based retirement in the presently described design, but retirement may be performed from the logs or through an auxiliary list, potentially placed in DRAM. For atomicity, it is necessary that only alias table entries from closed wraps be retired.

To permit retirement of the alias table entries in the background along with foreground activities (new wrap openings and closings, and wrap reads and writes) we use a two-table double-buffered approach. At any time one table is the active table and the other is being retired to PM. However, we need to be careful to avoid races or unnecessary locking in implementing such an approach.

FIG. 23 shows the two-table design. In the figure there are two hash tables 1209, Hash Table A 2311 and Hash Table B 2312; B is the currently active table while A is being retired to persistent memory. Additions of new alias table entries are only made to the active table. However, lookups must consult both tables until we are sure that the latest value of a variable has been written to PM, at which time the lookup can be made from its home location. In the figure, a store to variable W will Hash W 1401, lookup the active hash table B 2312 and either update the existing entry or add a new entry to B. A load of W will look up table B 2312 first, and if found there (as in the figure) return its value. On the other hand, a load of M will fail in table B 2312, and must be followed by a lookup of table A 2311. If a variable is not in either hash table, then it then it must be retrieved from PM, which is guaranteed to have its last updated value.

Figure 22:
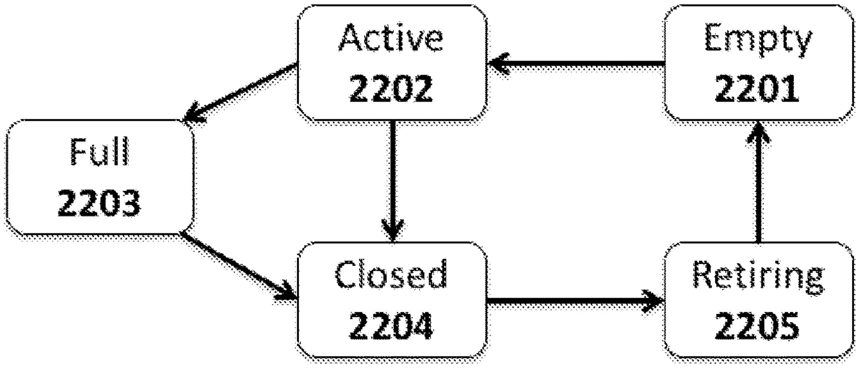
FIG. 22 is the lifecycle of Hash Table states within the Alias Table structure used for global aliasing.

The complete design of the two-table Alias Table design requires additional states to be maintained for the tables as shown in FIG. 22. Each table can be in one of five states: Empty (E) 2201, Active (A) 2202, Full (F) 2203, Closed (C) 2204, and Retired (R) 2205 with the following semantics. In the E state the table has no valid entries and is available for use. A table in the A state will be used for making updates and will be given priority in lookups. In the F state the table will not accept new update operations. When all wraps that were opened while this table was active complete, the table transitions to the C state. In the C state, it is safe to begin retiring the table entries to the PM. During this time lookups of the table from concurrently executing wraps can continue safely and without conflict. When the retirement of the entries to PM is complete, the table transitions to the R state. In this state no further lookups will be permitted; instead all lookups that are not found in the active table will go to PM. The table remains in the R state until the last of the wraps that may have started looking up the table (before it entered the R state) completes. At that point the table can be safely deleted or recycled by entering the E state.

The state transitions are maintained by wrapOpen and wrapClose functions. Wraps are tagged with one of four colors indicating the global state of the two hash tables when the wrap was opened. Let X and Y denote the two tables. We need to keep track of the active table at the time of opening a wrap since this can only be retired once these wraps have closed. Similarly, an arriving wrap needs to distinguish whether the non-active table has entered the R state or not, since the table cannot be deleted until all the wraps that could read it have closed.

On an OpenWrap, the wrap is placed in one of four sets AXRY, AXR'Y, AYRX, and AYR'X. The X or Y denotes a table, A indicates the active state, and R' means not in the R state. A counter of the number of wraps in each of these sets in maintained. On a wrapOpen at nesting level 0 the state of the tables is used to tag the thread, and the appropriate counter incremented. When a wrap at nesting level 0 closes, the counter corresponding to its tag is decremented. For active table X to transition to state C it requires that all wraps that were opened while X was active should close. That is the number of wraps in the set {AXRY U AXR'Y} is 0. Similarly, to transition from the R state to the E state, the number of wraps in the set {AYR'X} is 0.

Even though it may be an extremely rare case, a very long running transaction can exhaust all shadow DRAM space. Anticipating the possible corner case, a wrap manager thread may detect a long running transaction by periodically comparing the elapsed time of each open wrap to a user-defined threshold.

If the elapsed time exceeds this threshold, then the thread first attempts to speed the long running wrap along by preventing new wraps from opening. If unsuccessful, on a transaction abort or timeout, the alias table is cleared and all logs of successfully completed wraps are replayed-reading the log from PM and copying the variable in the log to its home PM location. Once this process is complete, the system is released back into normal operation.

Recovery after a sudden failure and restart is simple, and it proceeds as follows. The manager thread replays the redo log from a previous consistency point. Stale wraps are discovered (ones that never closed), and their log records are bypassed as a recovery thread updates PM location.

Different implementation alternatives are possible. First, as an alternative to creating aliases in DRAM, one could instead simply alias a variable to its copy in the redo log record, which requires trading away the cache efficiency (achieved by treating the log records as non-temporal and not caching them). That is, redo log records would now need to go through the cache hierarchy to allow fast path communication, and cache misses resulting from evictions of these records would have to access the slower PM rather than DRAM. That has the potential to degrade performance when the cache pressure is high and variable reuse is frequent. Also, the aliased location will change as different transactions access the variable and redirect it to their private log locations. Frequent updates will cause increased coherency traffic, as hash table entries are repeatedly invalidated.

The SoftWrAP aliasing approach is isolation agnostic: if the programmer chooses, she may choose to permit dirty reads or phantom reads by allowing one thread to read modified values from another thread's wrap operations even if the second thread has yet to reach a wrap close point. One optimization that is possible under the common model of strict isolation is to buffer up all updates in a local alias table and then flush them using efficient streaming or AVX VSCATTER operations from the local alias table to home locations in PM. Thus, value propagation within the wrap proceeds through local aliasing, but once the wrap closes with a log commit, the local alias table can be immediately reclaimed and values propagate normally through caches without aliasing.

The framework allows programmer to choose—global aliasing (default) for more flexibility and local aliasing for the common strict isolation case. A final consideration concerns the mapping of a shared persistent object in the address space of multiple threads. As is commonly done for shared libraries, in this implementation we assume a fixed mapping based on common agreement, in preference to more costly dynamic alias conflict-handling mechanisms.

Ordering between concurrent transactions is achieved at the transaction level by ensuring the same isolation that a developer employs for controlling concurrent execution independent of persistence of memory. Ordering among updates within a transaction needs to be reflected as all-or-nothing in its effect across a machine failure. This is achieved by ensuring that data updates made by the transaction are kept from appearing at their home addresses until the write-aside log has been committed and flushed to NVM. Since the write-aside log either commits or does not commit at the point of a machine/software crash, either all updates in the same transaction are committed (independent of their intra-transaction order) or none are committed. Data writes can thus be held up in caches and flow to backing NVM medium in arbitrary order, but they are visible to software threads (via cache coherence) in transaction order.

Concerning performance, FIG. 21 shows the number of PM writes and pcommit or persistent fence, or persistent store fence, operations for a wrap of n word-sized stores using three methods for persistence. Non-Atomic, which streams values directly to PM, updating cache values if present, requires the n words (to scattered PM locations) to be written to PM a single pcommit instruction to ensure their persistence. Undo Log requires a pcommit after writing each log record and another at wrap close to persist the updates. Each of the n log records (a record is 3 words long) generally require 1 cache line write, and each of the n updates require another write, for a total of 2n writes. The additional terms in the expression are 1 write for an end-of-log marker and a correction term to account for splitting of a log record at a cache line boundary. Cache lines are 64 bytes.

SoftWrAP can close the wrap after writing the 3n consecutive words (12 bytes) that make up the log, followed by a single pcommit. Due to write combining, this results in 12n=64 cache line writes. SoftWrAP can be easily integrated into existing applications. SQLite is implemented as a compact library and embedded database engine with a pluggable interface for extended media. SQLite performs writes to the main database file atomically by first creating a journal file. The journal file is like a re-do log in that if a crash happens before the main database update has been completed, the journal can be replayed to capture any outstanding changes.

FIG. 26 shows how SQLite 2601 is extended to use Persistent Memory using the Virtual File System Interface, PM VFS 2610. This interface requires implementation of Open, Close, Read, Write, Sync, and other methods that closely align with the SoftWrAP API. In left of the figure, SQLite VFS is created that performs all writes to PM. When the VFS requests a Sync or Close operation, a persistent memory fence is performed to ensure that all writes to PM have been committed. The PM Journal 2611 is also updated in PM just like the main database, and the journal can be discarded once the main database, now residing in PM, 2612, has been updated.

In the right of the figure, the SQLite VFS utilizes the SoftWrAP framework 2630 to create a WrAP VFS 2620. In the SoftWrAP version, the journal need not be created directly as direct writes to the database are contained within the SoftWrAP based logs. Only the main database 2612 needs to have updates when using SoftWrAP. Therefore, the updates to the main database 2612 can be streamed to the SoftWrAP log location and aliased in DRAM. Database reads need not query the PM based journal and PM database, but rather just utilize the SoftWrAP API and framework 2630, which can direct a read to either the DRAM alias table or home PM location. This reduces the overall number of PM reads, writes and persistent memory syncs. In such an application, where an application already delineates its updates clearly, the effort to introduce wrapping of those updates is low and straightforward.

The decoupling of concurrency control (or transaction isolation) from failure atomicity allows persistence to be added flexibly to code that is already multi-threading safe. For the common case of multi-threading safe or strictly isolated transactions, another embodiment further decouples the reclamation of the aliasing structure from the retirement of transaction logs and makes post-transactional values available immediately to subsequent transactions without aliasing. We call this design SoftWrAP-LAT, for SoftWrAP with a Local Aliasing Table.

Figure 24:
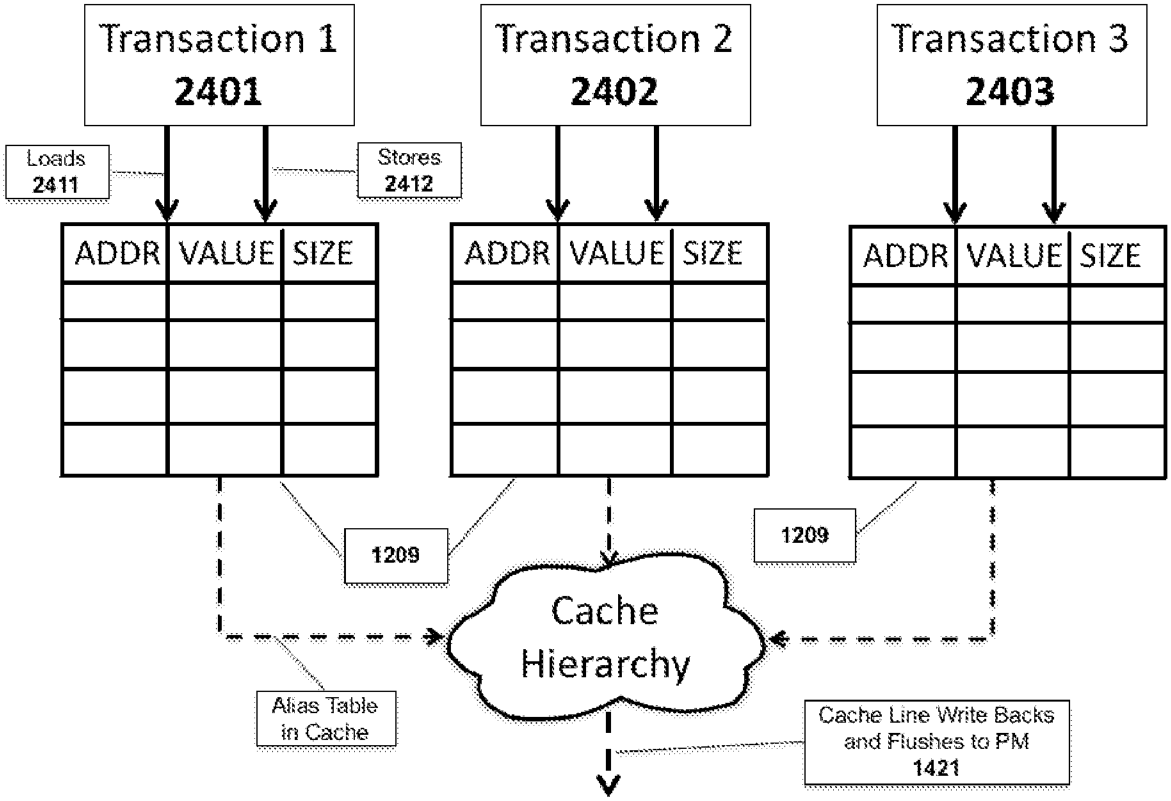
FIG. 24 shows Local Aliasing with SoftWrAP or SoftWrAP-TLAT, each Transaction (three are shown) has a separate alias table.

For entire persistence transactions which are strictly isolated from one another, as with serialization schemes such as locks, a shared alias table is not necessary. Instead, a local aliasing scope suffices to forward values from writers to readers. The SoftWrAP-LAT pseudo-code is shown in FIG. 25; its difference from a shared aliasing scheme is discussed. As shown in FIG. 24, each persistence transaction, 2401, 2012, and 2403, maintain a private (local) alias table 1209 that is allocated in DRAM at the time of OpenWrap when the transaction also allocates a log record. For loads 2411 and stores 2412, the library calls wrapStore and wrapLoad operate on aliased entries as in SoftWrAP global, except that the aliasing is performed through Transaction Local Aliasing, since strict isolation removes any overlap among variables written in one transaction and concurrently read in another. On CloseWrap, each persistence transaction streams the updated values from its local alias table to the cache hierarchy. The updated values may asynchronously move to PM and are available in place (at their PM addresses) without aliasing, for subsequent transactions.

To expedite trimming of log records, updates may be flushed (using CLWB) 1421 and durably fenced (using a persistent fence or store fence); however, it is possible to batch the fencing for data value updates for multiple transactions as an optimization.

In another embodiment, values may be copied directly to PM on a commit as well or streamed from the local alias table to home locations using non-temporal store instructions which also update the values if present in the cache hierarchy. Alternatively, values can just be copied to the cache after the log is persisted. The cache can be dumped to home locations before pruning the log, or the log may be processed. Alternatively, the alias table can first (after log is persisted), copy values to the cache. Then in the background copy to home locations, perform a persistent memory fence, and then prune the logs. This method may reduce PM traffic by avoiding log reads.

The SoftWrAP-LAT approach can be also used when applications can tolerate unprotected reads, i.e. eager reads of variables (not yet durably committed) that produce stale values. Also, SoftWrAP-LAT can make streaming of log and data values to PM efficient with AVX VSCATTER operations, akin to SoftWrAP. Further, a compiler can be used to maximize static aliasing at compile time since SoftWrAP-LAT aliased values do not exist beyond each wrap.

Hardware Transactional Memory Concurrency Control for Persistent Memory

Some instructions can cause an immediate abort of an HTM Transaction. These instructions include non-temporal or streaming stores, global synchronization instructions, and cache flushing instructions, since these instructions affect and alter the state of the cache hierarchy and write-buffers, on which Hardware Transactional Memory relies upon. Since HTM causes aborts within a transaction if non-temporal or streaming stores are used within the transaction, a programmer cannot do any direct, persistent logging within the transaction. This forces the programmer to persist logs outside of a transaction. With undo logging all values must be known up-front and can complicate recovery situations in HTM. HTM transactions in Intel instruction sets, are surrounded by XBegin and XEnd.

Figure 27:
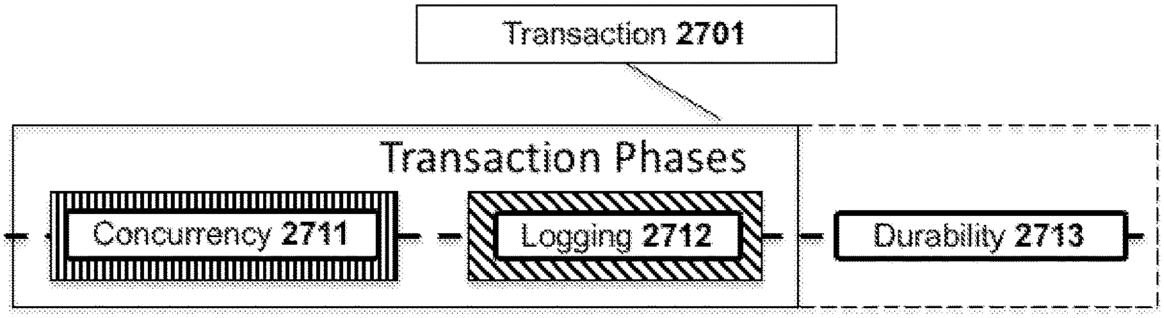
FIG. 27 shows the transactional phases the present invention breaks a transaction into: a concurrency phase using HTM, a logging phase, and a durability phase, where the durability phase can be strict or relaxed.

In our approach, we rely on Redo logging to avoid having to know all the variables in a transaction before the HTM transaction begins. Therefore, we can use functions to open, close, and read and write variables in transactions, without profiling existing code. This simplifies both the code and the model. Our model has three basic sections as shown in FIG. 27. A Transaction 2701 has three main phases, a concurrency phase 2711 using HTM, a logging phase 2712 using redo logging, and a durability phase 2713. A transaction may complete and continue operations, relaxed durability, or delay until strictly durable for replaying the transaction if a failure were to occur. Relaxed durability allows for a transaction to continue operations fast, as the transaction will be durably committed at a later point.

To couple persistence with parallelism our solution solves three challenges: catching cache evictions, ordering for determining a persistence ordering on the transactions, and persisting the transactions in the correct order for consistency.

Choosing an arbitrary time within a transaction even though the HTM will abort with conflicting read and write sets. An arbitrary time would work with non-conflicting variable sets, since replaying transactions of nonconflicting variables may be performed in any order, as they won't conflict. However, due to intra-transaction delays and write ordering, ordering is difficult.

Figure 28:
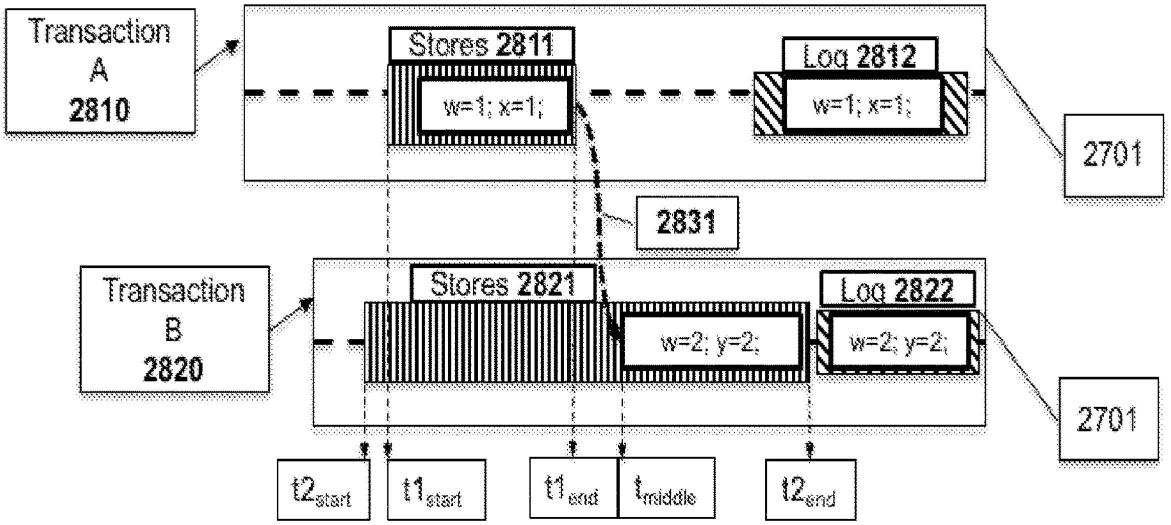
FIG. 28 shows two example transactions and the ordering complexities between the various phases.

Now referring to FIG. 28. A Transaction A 2810, has a sequence of stores 2811 and Transaction B 2820 has a sequence of conflicting stores 2821. However, the stores of B 2820, even though the transaction started first, occur and do not conflict with A 2810, as the concurrency section 2811 completed earlier. The transactional values 2831 flow to 2821 concurrency section. Logging 2812 of Transaction A 2810 and logging phase 2822 of Transaction B 2820, must be ordered correctly. At the end of the transaction, the full and completed read and write sets are dependencies to other transactions. Therefore, if there is any conflict in these sets then the transaction will abort the HTM section. Using the end times allows notification that the transaction has completed its full read and write sets. If a delay is experienced by a transaction after reading the time and before the XEND command and the transaction still completes, then no other pending transaction completed that had overlapping read write sets during the period before the end, and the transaction can be safely retired by the ending time. We use a counter value obtained at the end of the HTM section when the store set is completed, as discussed in the following paragraphs.

Figure 29:
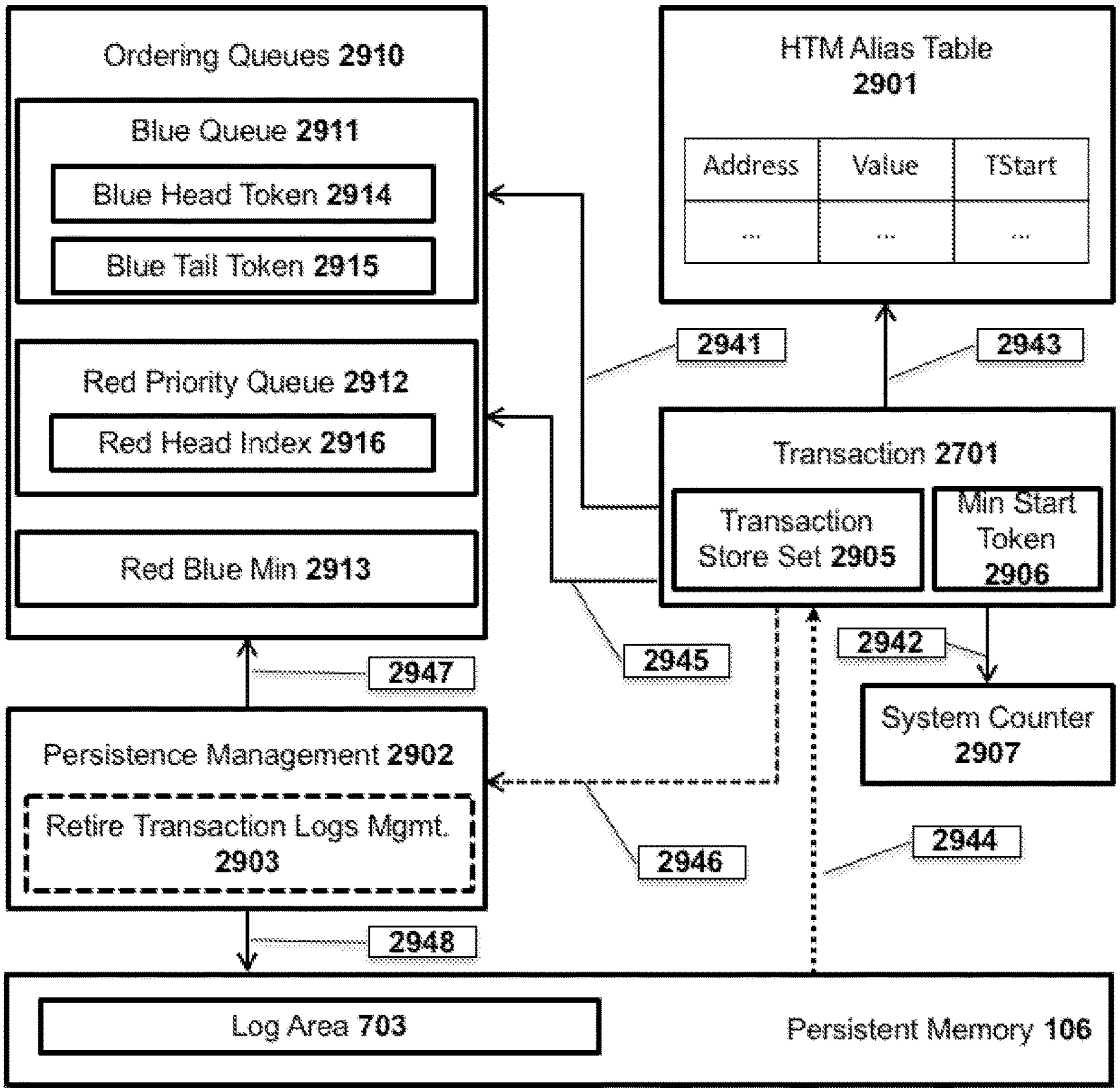
FIG. 29 shows the steps and interactions a transaction utilizing HTM for concurrency control requires for durability to Persistent Memory.

Now referring to FIG. 29. The pseudocode for implementation is presented in FIG. 33 for the transaction interface, FIG. 34 for the Queue Management Sub Routines, and FIG. 35 for the Queue Management Routines. A pair of Ordering Queues 2910 maintain the ordering for durable HTM transactions. A Blue first-come-first-serve (FCFS) Queue 2911 indicates the order in which transactions have started and contains the start time of the transactions. The Blue Head Token 2914 and Blue Tail Token 2915 point to the head and tail of the queue as indexes in an array. The Red Blue Min 2913 is the minimum index in the Ordering Queues 2910 of all open transactions. When a Transaction 2701 starts, it places itself in the Blue FCFS queue with an indication of the start time, step 2941. The transaction may record the minimum Red Blue minimum index 2913 and save it as the Min Start Token 2906 which is used to age values in the HTM Alias Table. A transaction then enters the concurrency section (phase 2711). Loads and stores are handled by consulting an HTM alias table 2901 for all loads and stores, step 2943, in the concurrency section. If a value to load is not in the HTM Alias Table 2901 it is loaded from PM 106 in step 2944. Stores are saved into the HTM Alias Table 2901 along with the address, value, and min start token read by the transaction. Stores are also added to the Transaction Store Set 2905 which may be persisted as a cached version of the log after the transaction has completed. If running out of space for aliasing, values may be compared to the start token and aged out or written back to PM 106 if logs are used only for recovery. Aged values are compared against the saved start time in the table and the Transaction Min Start Token 2906. If the token in the table is less than the transaction Min Start Token 2906, then the value in the table may be deleted (if playing logs from the retire transaction management routine 2903) or written back to Persistent Memory 106. As the last step before the end of the concurrency section, the transaction records the end time from a system counter 2907, Step 2942, and completes the concurrency section. Next, the transaction publishes its concurrency completion time. At this Step 2945 the Transaction 2701 adds itself to a Red priority queue 2912, with its completion time as the priority. The Red priority queue is ordered by increasing completion times and contains a Red Head Index 2916. The transaction then removes itself from the Blue FCFS queue 2911.

Still referring to the same figures, a transaction may notify a Persistence Management routine 2902 that it has completed, step 2946. Alternatively, the routine may monitor the Ordering Queues 2910 by waiting for updates to the head of the Red Queue and actively updating the Red Blue Min 2913 to the earliest transaction that has not completed. After the transaction has completed writing its log, it marks itself as complete in the Red priority queue 2912. Transaction logs may be persisted from the Red priority queue or from the transaction. When the head of the Red priority queue is marked complete, the priority (transaction concurrency section end time) is compared to the time value of the head of the Blue queue. If the transaction concurrency section end time of the transaction at the head of the Red priority queue is less than the transaction start time of the head of the Blue queue, then the transaction log can be persisted to home locations, step 2948 with a retire logs management routine 2903. Note there might be multiple management routines 2903 that can partition logs and operate concurrently. There are no other transactions from the Blue FCFS queue that can possibly go to the head of the Red queue. Delays in publishing the completion time of the concurrency section only increase the time value for moving to the Red queue since concurrency completion time is strictly greater than start time.

FIG. 30 shows an embodiment of the Ordering Queues 2910 which are in a single bounded table. Note that the table may be unbounded or dynamically allocated. The bounded table allows for restricting the lag for relaxed durability transactions. The Red-Blue Min 2913 is the minimum transaction in the system that has not copied values to PM. The Blue Head Token 2914 is the head of the logical Blue Queue and Blue Tail Token 2915 is the end of the queue, which is the token identifier of the next transaction. A Red Head Index 2916 is the index for the head of the Red Queue. When a transaction starts it increments a counter atomically and is added to the Blue Queue via the Blue Tail Token 2915. When a transaction completes, after reading a system counter, it orders itself in the Red Queue by starting at the Red Head Index 2916 and finding the place in the ordered queue by examining the Red Time file in the Ordering Queue 2910. When the log is written, the transaction updates the Log Pointer field and completes. A processing thread in 2902 may read the head of the read index and copy transactional values safely to PM when the head element has a Red Time less than the Blue Head Token 2914 start token.

Figure 31:
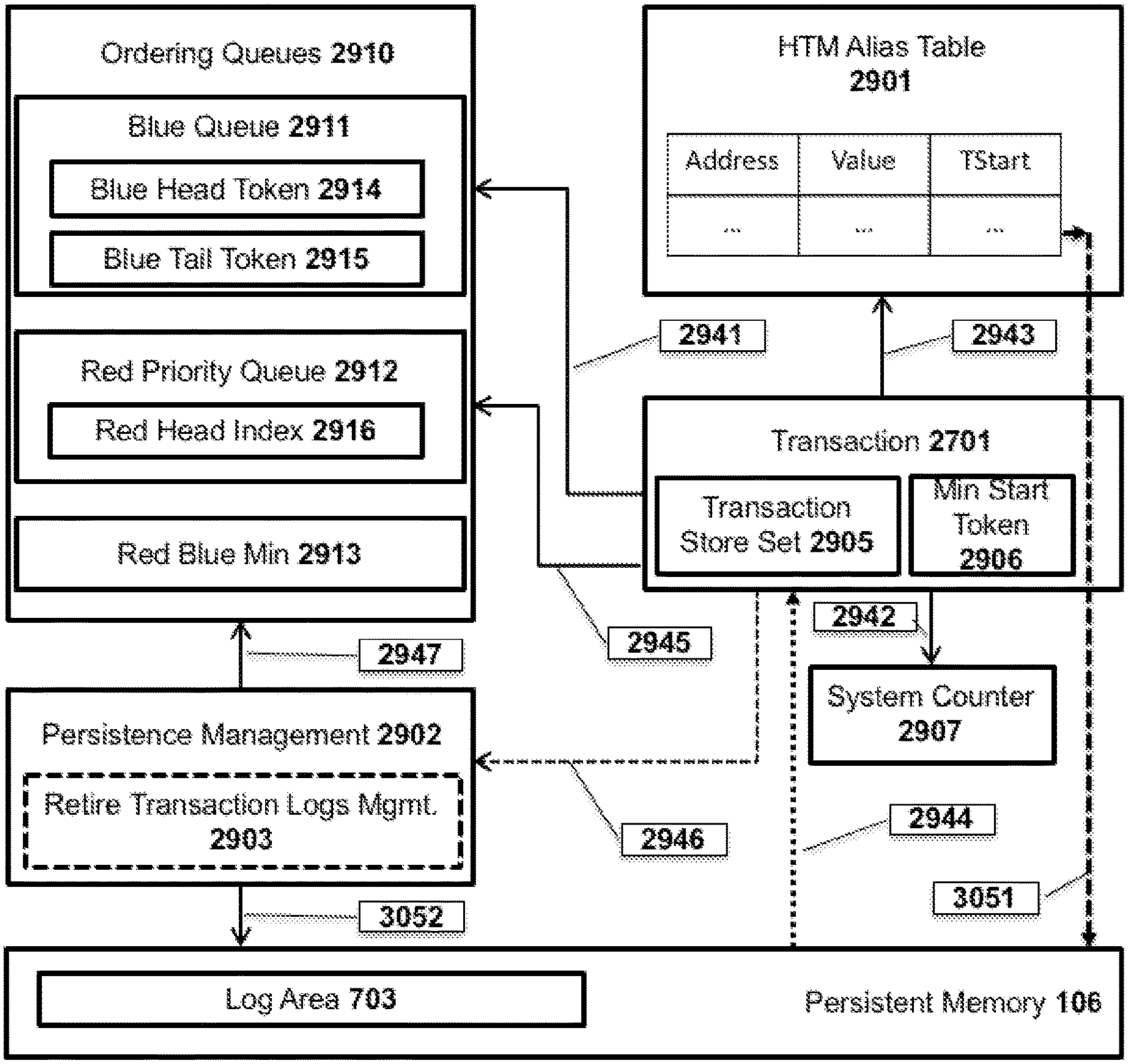
FIG. 31 shows an embodiment of a transaction using HTM and PM persisting durably with an HTM Alias Table performing write-backs to persistent memory.

Now referring to FIG. 31. The HTM Alias Table 2901 may copy values directly back to Persistent Memory 106 if configured to do so in Step 3051 only when the alias table entry has a recorded TStart time that is less than the Red Blue Min 2913 recorded by a Transaction 2701 into the Min Start Token 2906 at the start of the transaction time. In this embodiment, the Retire Transaction Logs Management 2903, need not copy completed logs from the Transaction Store Set 2905 in Log Area 703, to Persistent Memory 106, as the most recent values will be handled by the HTM Alias Table 2901. However, in Step 3052, the Retire Transaction Logs Management 2903, may periodically save the HTM Alias Table 2901, values to main Persistent Memory 106, to free alias space, or may copy completed logs to home locations in Persistent Memory 106.

The Retire Transaction Logs Management 2903, and Persistence Management 2902, may recover the system after a failure. They do so by reading completed logs and ordering them by the system counter value saved in the log. The uncompleted logs, those logs with a missing persistence system counter saved in it, are examined and the minimum start counter is saved. Once the logs are ordered, the logs are processed in order until the first log that has an incomplete store set, or the start counter or completed counter of the completed log is greater than the start counter of the minimum of all of the uncompleted logs is found.

Figure 32:
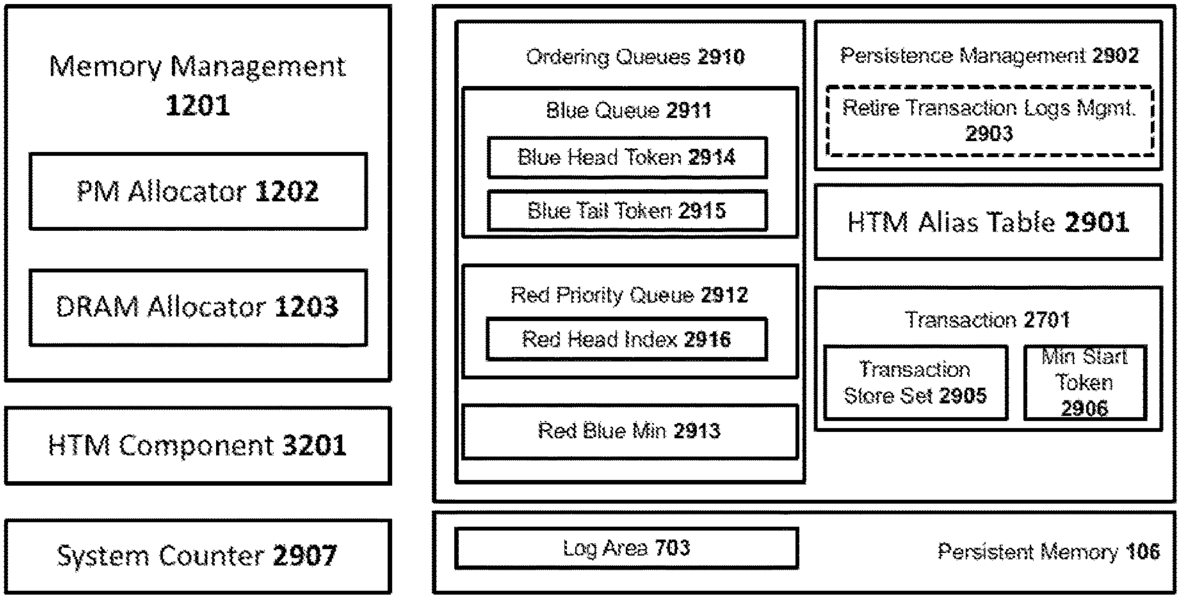
FIG. 32 shows the system for performing durable writes to persistent memory when using HTM as a concurrency control mechanism.

FIG. 32 shows an embodiment of a system of the components described for FIGS. 29 and 31. Memory Management routine 1201 supplies allocators for Persistent Memory 106 with a PM Allocator 1202 and DRAM with 1203. The HTM Alias Table 2901 may be configured for write-back to Persistent Memory 106 or values may be purged based on the aging mechanism. The Transaction 2701 contains the Transaction Store Set 2905 which contains all stores made to Persistent Memory 106 during the transaction and the Min Start Token 2906 is read on a transaction start. The Ordering Queues 2910 as described previously and in FIG. 30 contain the Blue Queue 2911 and Red Priority Queue 2912 and the Red Blue Min 2913 components used for ordering. The HTM Component 3201 may be any HTM implementation supplied by a vendor such as Thread Synchronization eXtensions or TSX by Intel, Restricted Transactional Memory or RTM by Intel, or HTM by IBM, or any other implementation of Hardware Transactional Memory. The System Counter 2907, may be a platform-wide read time step counter, such as RDTSCP by Intel, or any platform wide counter or implementation that provides ordering. The counter may be implemented using any method of updating a shared counter through the use of atomic fetch and increment or any other method as known.

Now referring to FIG. 33. Transaction loads and stores are implemented as calls to a user library. The Load library call first checks the HTM Alias Table 2901 for the requested address using the function getAliasTableEntry. The function returns the entry in the table that matches the supplied address or, if no entries match, returns the entry in the associative set with the smallest timestamp as a possible candidate for reclamation. The Load call returns the value in the table if found; else it performs a normal LOAD from the Persistent Memory 106 address of the variable and returns the value. The Store library call similarly checks the HTM Alias Table 2901. If the location is found in the table, the entry is updated with the new value; else if there is a stale entry that can be reclaimed, then the address, new value, and the start timestamp of the transaction doing the store are entered in the reclaimed entry. If no entry is available, the transaction explicitly aborts. Note we do not try to evict entries from the Alias Table to make space, but instead use a simple aging mechanism to reclaim stale entries. This reduces contention for the HTM Alias Table 2901 that would otherwise cause many spurious aborts due to accesses for table management. To facilitate conflict free reclamation each entering transaction sets a private variable myObservedMin to the lowest start timestamp of all transactions in the system. If an HTM Alias Table 2901 entry has a timestamp smaller than this value, the last transaction that wrote that entry has retired and the space can be safely reclaimed. Alternatively, HTM Alias Table 2901 entries that may be reclaimed for space may be safely written back to Persistent Memory 106 and log processing routines for completed transactions relaxed, only being invoked on recovery or to periodically purge logs.

Now referring to the user library routines in FIG. 33 and Ordering Queues management routines in FIG. 34. To start, transaction invokes the library function TransactionStart routine. The function QueueNotifyStart returns the (unique non-decreasing) transaction id that also serves as its start timestamp startTS. The current minimum start timestamp of all transactions currently in the system is computed by the function QueueGetMin and is saved locally in myObservedMin. The transaction then starts executing XBegin and begins its HTM section. Note that any implementation for HTM start may be used depending on the processor vendor. Load and Store operations within the HTM section are implemented by accesses to the HTM Alias Table 2901 as previously described, with transactional stores additionally appending to the Transaction Store Set 2905 which may be an in-cache version of the store set of the transaction log. After the last instruction of the HTM section the library function TransactionEnd is invoked. This reads a platform counter. In a preferred embodiment, this counter is read by using RDTSCP. Prior to reading RDTSCP, a store to a volatile address may be performed to prevent processor reordering. Then, the function ends the HTM transaction with XEnd, or a platform HTM end as given by a vendor. The transaction obtains the end timestamp, records the persistence timestamp, and saves its log to Persistent Memory 106. The log may be persisted by a sequence of CLWB (cacheline writebacks) instructions that write back the values cached during the HTM execution, followed by a persistent memory fence. The function QueueNotifyEnd moves the transaction to its correct location in the priority queue. The transaction then waits for durability by calling function QueueTxCommit. The transaction can continue when it is signaled by the Persistence Management Routine 2902. The routine can be configured to allow the thread to immediate continue (relaxed durability) or wait until it is the head of the Red Priority Queue 2912 for strict durability.

When a transaction starts, it updates a first system counter that is used as its transaction id, which is used to allocate a slot in the Blue Queue 2911 that is populated from the Blue Tail Token 2915 and freed from its Blue Head Token 2914. When a transaction enters the Red Priority Queue 2912 it marks itself as deleted in the Blue Queue 2911. The Blue Head Token 2914 points to the earliest transaction that has not been marked for deletion, and the Blue Tail Token 2915 is the last entry that has been allocated. If the transaction at the head of the Blue Queue 2911 is marked as deleted, the Blue Head Token 2914 is advanced sequentially until it points to an entry that has not been deleted or reaches the tail of the Blue Queue 2911. The amortized time per deletion is a constant.

The Red Priority Queue 2912 is organized as a singly-linked list arranged in increasing order of the persistence timestamps, permitting simple concurrent insertion and deletion using Compare-and-Swap instructions. When changing color from Blue to Red in QueueNotifyEnd, the persistence timestamp of the transaction is used to find its position in the Red Priority Queue 2912 using function FindInsertNode. Using the head pointers of the Blue and Red queues, entering transactions can update myObserved-Min in constant time by comparing the start timestamps of the entries at the head of the two queues.

FIG. 35 shows pseudo-code for Persistence Management 2902 routines. A retirement thread simply calls Retirement-Thread, which continuously calls CheckRetirement. When it is safe to retire a transaction, it reads log records of the entry at the head of the Red Priority Queue 2912 stores them to their home locations. The routine monitors the Red Priority Queue 2912 and retires the transaction at the head when its startTS is smaller than the startTS of the entry at the head of the Blue Queue 2911. This ensures that it is the transaction with the smallest persistence timestamp in the system. After retirement the element at the head of the Red Priority Queue 2912 must be deleted from the list. A lock-free implementation in which the element is marked with a flag for removal from the linked list before removal is used to prevent concurrent insertions from swapping into the next pointer simultaneously. The queues may be implemented using a statically allocated circular buffer (as shown in FIG. 30) or dynamically allocated and managed. On retirement, the minimum element of the queues is updated using UpdateMin and UpdatedBlueHead to update the Blue Head Token 2914.

When an element is added to the Blue Queue 2911, it is simply placed in the tail, the Blue Tail Token 2915. When one of the Blue colored elements is ready to change to Red, the endTS time is saved with the persistTS time. The element is added to the Red Priority Queue 2912 by atomic compare-and-swap after finding the index in the queue using the FindInsertNode routine. When an element is retired, it is removed from the Red Priority Queue 2912 and the next element in the queue is examined.

Persistent Memory Controller

Figure 36:
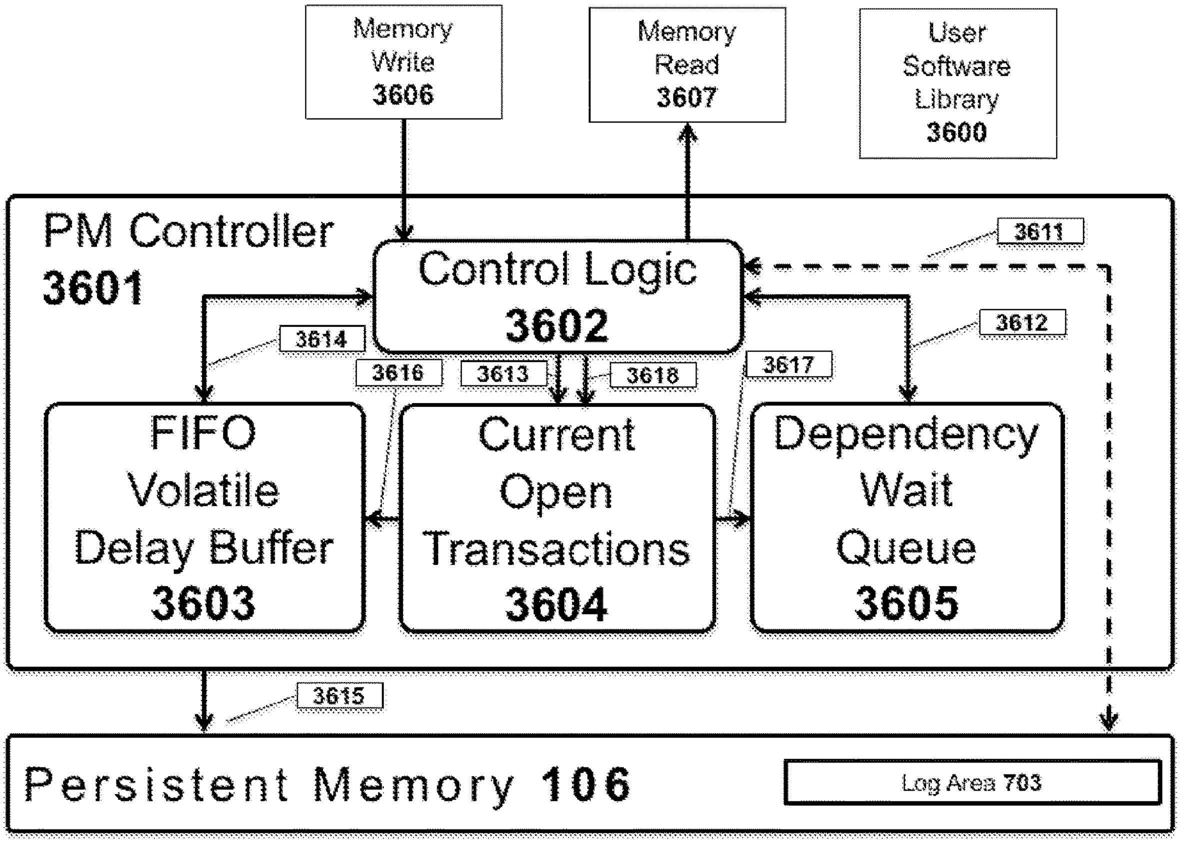
FIG. 36 shows a back-end persistent memory controller that orders transactions and supports HTM concurrency control mechanisms.

FIG. 36 shows an embodiment of The Persistent Memory Controller 3601. This back-end persistent memory controller allows for use of HTM as a concurrency control mechanism and prevents any transaction's updates from reaching PM until it is safe for it to do so by enforcing logs of a transaction have been made persistent and guaranteeing that the saved log will be played during recovery. The PM Controller 3601 tracks transactions by maintaining a COT (Currently Open Transactions 3604) set S. A user software library 3600 allows for transaction lifecycle and communication with the controller, described in the following paragraphs. When a transaction opens, using the Control Logic 3602, its identifier is added to COT and when the transaction closes it is removed, respectively Step 3613 and Step 3618. The write or store into PM of a cache line C evicted into the Persistent Memory Controller (Step 3606) is deferred by placing it at the tail of a FIFO queue maintained by the controller, Step 3614, into the FIFO Volatile Delay Buffer 3603. The cache line is also assigned a tag called its dependency set, initialized with S the value of COT, Step 3616, at the instant that C entered the Persistent Memory Controller 3601. The controller holds the evicted instance of C in a FIFO until all transactions that are in its dependency set (i.e. S) have closed. When a transaction closes it is removed from both the COT 3604 and from the dependency sets of all the FIFO entries. When the dependency set of a cache line in the FIFO becomes empty, it is eligible to be flushed to Persistent Memory 106, Step 3615. The dependency sets will become empty in the order in which the cache lines were evicted, since a transaction still in the dependency set of C when a new eviction enters the FIFO Volatile Delay Buffer 3603 will also be in the dependency set of the new entry. The protocol guarantees that all transactions that opened before cache line C was evicted into the controller (which must also include the transaction that last wrote C) must have closed and persisted their logs when C becomes eligible to be written to PM. This also implies that all transactions with a start time less than the persist time of the transaction that last wrote C would have closed, satisfying the condition for log replay. Hence the cache line can be safely written to PM without violating atomic persistence. Each completed transaction saves its log in Persistent Memory 106 using a bypass in the Control Logic 3602, directly to the Log Area 703, Step 3611. The log holds and records the transaction start and end times recoded using a system wide platform counter. This counter may by the RDTSCP instruction.

Still referring to FIG. 36, the FIFO Volatile Delay Buffer (VDB) 3603 may be comprised of a FIFO queue and hash table that points to entries in the FIFO queue. Each entry in the FIFO queue contains a tuple of PM address, data, and dependency set. Additionally, the PM address is inserted into the hash table with a pointer to the FIFO queue entry. If the address already exists in the hash table, then it is updated to point to the new queue entry. On a memory read, Step 3607, the hash table is first consulted. If an entry is in the hash table, then the pointer is to the latest memory value for the address, and the data is retrieved from the queue. On a hash table miss, PM is read and data is returned. As wraps close, the dependency set in each entry in the queue is updated to remove the dependency on the wrap. When the dependency set is empty, the cache line is written back to Persistent Memory 106, Step 3615. The entry is removed from the FIFO VDB 3603, and if the hash table entry in the VDB points to the FIFO entry, the hash table entry is removed.

Still referring to FIG. 36, the Dependency Wait Queue (DWQ) 3605 handles durability by tracking transactions waiting on others to complete and notify the transaction that it is safe to proceed. The DWQ 3605 is a FIFO queue similar to the VDB with entries containing pairs of the dependency set and a durability address. When a thread notifies the Persistent Memory Controller 3601 that it is closing a transaction, it can request strict durability by passing a durability address, Step 3612. This address is tagged with the COT 3604 in Step 3617. Dependencies on closing wraps are also removed from the dependency set for each entry in the DWQ 3605. When the dependency set becomes empty, the controller writes to the durability address and removes the entry from the queue. Threads waiting on a write to the address can then proceed.

Figure 37:
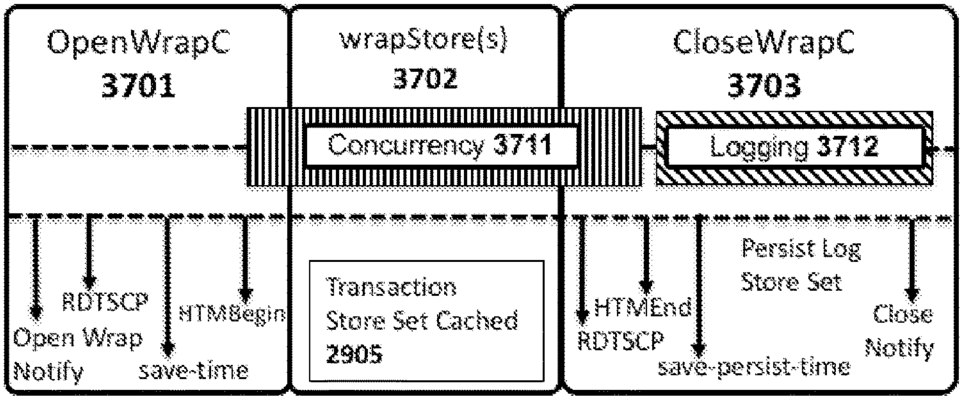
FIG. 37 shows phases and events for the support operations and user-interface for the back-end persistent memory controller.

The transaction phases are shown in FIG. 37. The transaction has a Concurrency phase 3711 managed by HTM and a Logging phase 3712. Stores to Persistent Memory addresses are saved in a Transaction Store Set 2905 that is held in cache during the transaction. The transaction opens by calling OpenWrapC 3701 which opens the transaction and notifies the controller, saves a start time and begins a transaction. The wrapStore 3702 routines both perform the desired store to the Persistent Memory location and also save the address and value to a Transaction Store Set 2905. When the transaction is completed, it calls CloseWrapC 3703, which obtains the end time, closes the HTM transaction, persists the log comprised of the times and store set, and notifies the controller. The transaction may wait for strict durability notification from the controller or the thread of execution may close and continue.

FIG. 38 shows the pseudo code for the user software library 3600 which interfaces with the Persistent Memory Controller 3601. The number of active HTM transactions at any given time is bounded by the number of CPUs, therefore thread identifiers are used as wrapIds. In OpenWrapC, the function notifies the Persistent Memory Controller 3601 that a wrap has started, described later. We then read the start time with RDTSCP and save it and an empty write set into its log persistently. Note that other time stamp reading routines are possible. The transaction is then started with the HTMBegin routine. During the course of a transactional computation, the stores are performed using the wrapStore function. The stores are just the ordinary (speculatively performed) store instructions but are accompanied by (speculative) recording of the updates into the log locations, each capturing the address, value pair for each update, to be committed into PM later during the logging phase (after XEnd). In CloseWrapC, the ending timestamp is obtained for the HTM transaction into the persistTime variable in its log. Its concurrency section is then terminated with the HTMEnd routine. At this point, the cached write set for the log and ending persistent timestamp are instantly visible in the cache. Next, transactional values in the Transaction Store Set 2905 and the persist timestamp are flushed to the log area followed by a persistent memory fence. The transaction closure is then notified to the Persistent Memory Controller 3601 with the wrapId, and along with it, the durabilityAddr, if the thread has requested strict durability (by passing a flag to CloseWrapC). A Monitor-Mwait construct may be used to receive memory based signaling from the Persistent Memory Controller 3601. If strict durability is not requested, then CloseWrapC can return immediately and let the thread proceed immediately with relaxed durability.

FIG. 39 shows the Persistent Memory Controller 3601 pseudo code, which supports the two interfaces from software, namely those for Open Wrap and Close Wrap notifications exercised from the user library as described previously. Notification implementation mechanism may consist of software writing to a designated set of control addresses for these notifications. The controller also implements hardware operations against the VDB 3603 from the processor caches: Memory Write 3606, for handling modified cachelines evicted from the processor caches or non-temporal stores from CPUs and Memory Read 3607, for handling reads from PM from the processor caches. The Open Wrap Notification simply adds the supplied (wrapId) to a bit vector of open transactions, the Current Open Transactions COT 3604. When the controller receives a Memory Write 3606 (i.e., a processor cache eviction or a non-temporal, streaming, un-cached write) it checks the COT 3604. If the COT is empty, writes can flow into the PM. Writes that target the log range in PM can also flow into PM irrespective of the COT 3604. For the non-log writes, if the COT 3604 is nonempty cache line is tagged with the COT and placed into the VDB. The Close Wrap Notification receives the wrapId and durability address, durabilityAddr. The controller removes the wrapId from the Current Open Transactions COT 3604 bit mask. If the transaction requires strict durability, the durabilityDS and COT 3604 are saved as a pair in the DWQ 3605. The controller then removes the wrapId from all entries in the VDB 3603 and DWQ 3605. This is performed by simply draining the bit on the dependency set bit mask for the entire FIFO VDB 3603. If the earliest entries in the queue result in an empty dependency set, the cache line data is written back in FIFO order. Similarly, the controller removes the wrapId from all entries in the Durability Wait Queue DWQ 3605.

As an alternative for implementing strict durability in the controller, strict durability may be implemented entirely in the software library 3600, with the following modifications. On a transaction start, threads save the start time and an open flag in a dedicated cache line for the thread. On transaction close, to ensure strict durability, it saves its end time in the same cache line with the start time and clears the open flag. It then waits until all prior open transactions have closed. It scans the set of all thread cache lines and compares any open transaction end times and start times to its end time. The thread may only continue, with ensured durability, once all other threads are either not in an open transaction or have a start or persist time greater than its persist time.

A recovery procedure for the Persistent Memory Controller 3601 is invoked on reboot following a machine failure. This recovery procedure may be entirely implemented in the user software library 3600 or implemented in the controller. The routine will restore Persistent Memory 106 values to a consistent state that satisfies persistence ordering by copying values from the store sets of the logs of qualifying transactions to the specified addresses. A transaction qualifies for log replay if and only if all earlier transactions on which it depends (both directly and transitively) are also replayed. The recovery procedure first identifies the set of incomplete transactions, set B, which have started (as indicated by the presence of a startTime record in their log) but have not completed (indicated by the lack of a valid end-of-record marker). The remaining complete transactions (set C) are potential candidates for replay. A transaction in C is valid (qualifies for replay) if its end timestamp (persistTime) is no more than the minimum startTime in set B. All valid transactions are replayed in increasing order of their end timestamps persistTime.

In a method for reading the system counter, the global system time stamp counter using the new Intel instruction RDTSCP, or read time stamp counter and processor ID, may be used to provide the end transaction time ordering. Older versions of the read time step counter, RDTSC, had to preceded by a serializing CPUID instruction so that previous instructions did not get reordered after the RDTSC instruction. The new RDTSCP instruction has the nice benefit of not reading the time stamp counter until all previous instructions have been completed. However, subsequent instructions may get reordered before the RDTSCP. To prevent the reordering of subsequent instructions, such as an XEND, before reading the timestamp counter into registers, the resulting time stamp is saved into a volatile memory address.

Since XEND makes all stores instantly visible, the time stamp in memory is just before the end of the transaction with full read and write dependency sets. We create a register dependency from the result of the RDTSCP, save it into memory, then XEND. Additionally, we perform a read of a volatile memory value before reading RDTSCP to prevent reordering before prior instructions. Alternatively, a global counter can be used for ordering but may induce additional aborts due to store set conflicts. For other counters outside of the HTM, the RDTSCP requires an ordering instruction following it to prevent reordering after. Also, for counters outside an HTM concurrency-controlled section, a global counter can be used an updated with atomic load and increment routines, ideally the counter being located on its own cache line to avoid collisions.

We claim:

1. A method for providing transaction support for concurrent threads to allow programmers to couple Persistent Memory relaxed durability with the isolation of Hardware Transactional Memory (HTM) originally designed for Dynamic Random Access Memory (DRAM) concurrency-control through a multi-phase sections software library, the method comprising:

upon receiving a request for a transaction start, reading a first system counter, creating a transaction log in a Persistent Memory area, persisting the counter to the log and issuing a persistent memory fence, storing the first system counter in volatile memory, initializing a store set, and starting an HTM concurrency section;

and upon receiving a request for a transaction end, reading a second system counter, ending the HTM concurrency section, starting the logging section, reading a third system counter using an atomic load and increment routine, persisting the second system counter, store set, and third system counter to the log, and issuing a persistent memory fence, and notifying a persistent management routine of completion in the durability section.

2. The method of claim 1 further comprising upon receiving a store request to a Persistent Memory location in the HTM concurrency section:

asynchronously storing the address and value to the store set;

determining whether an alias for the Persistent Memory address exists;

upon determining that the alias address exists, performing a store of the value to the alias address location;

and upon determining that the alias address does not exist, determining whether there is space for the alias address and value, upon determining there is free space, storing the value to the alias address location and associating the alias address with the Persistent Memory address, and upon determining there is insufficient space, aborting the HTM concurrency section and aborting the transaction.

3. The method of claim 2 further comprising upon receiving a load request to a Persistent Memory location in the HTM concurrency section:

determining whether an alias for the Persistent Memory address exists;

upon determining that the alias address exists, returning the value in the alias address location;

and upon determining that the alias address does not exist, returning the value in the Persistent Memory location.

4. The method of claim 3 further comprising after receiving a request for a transaction start, determining the minimum value from the value of all currently open transaction first system counter values and storing the value as the observed start minimum.

5. The method of claim 4 wherein the observed start minimum is maintained by an ordering routine.

6. The method of claim 5 further comprising freeing alias addresses and values that have been durably persisted onto Persistent Memory by:

upon determining there is free space for the alias address and value also storing the observed start minimum recorded by the transaction as the store time with the alias value;

and upon determining there is no free space for the alias address and value, first searching for an alias with a store time less than the observed start minimum recorded by the transaction, and if found, replacing the alias entry with the Persistent Memory address, value, and observed minimum start value.

7. The method of claim 6 after finding an alias entry for replacement, further comprising, writing back the value to be replaced back to its Persistent Memory location.

8. The method of claim 7 further comprising asynchronously notifying the persistent management routine by storing the log location into an address table and the persistent management routine processes the completed logs using a table by:

maintaining the observed start minimum value from all transactions that have not completed the HTM concurrency section as the earliest entry in the table;

upon receiving the log location value, marking the transaction as completed, storing the transaction third system counter into the table, reading the second system counter value and finding the ordered place in completed transactions in the table;

upon the earliest completed transaction has a third system counter less than the minimum recorded first system counter value transaction, copying the values from the store set to the Persistent Memory locations and removing the log.

9. A method for ordering one or more Hardware Transactional Memory (HTM) originally designed for Dynamic Random Access Memory (DRAM) concurrency-controlled transactions for durability onto Persistent Memory through a multi-phase sections software library, the method comprising:

upon receiving a request for a transaction start, reading a first system counter, storing the counter into memory, and starting an HTM concurrency section;

upon receiving a request for transaction end, reading a second system counter, storing the second system counter into memory, and ending the HTM section.

10. The method of claim 9 before starting an HTM concurrency section, further comprising saving the first system counter to a log in Persistent Memory.

11. The method of claim 10 further comprising upon completing the HTM section, saving the second system counter to the log in Persistent Memory.

12. The method of claim 9 wherein the system counters are a shared platform wide read time step counter safely recorded by performing a volatile memory load prior to reading the system counter to prevent instruction reordering.

13. The method of claim 12 further comprising saving the store set of all values stored during the HTM concurrency section and persisting the store set to the log before closing the transaction.

14. The method of claim 13 further comprising a recovery routine to restore system state, the recovery routine comprising:

reading all transaction logs;

determining minimum open value as the minimum value from the set of first system counter values from all logs not marked as complete;

determining an order of the completed transaction logs based on the second system counter values;

and in the order of the second system counter values of completed transaction logs, copying the store set to Persistent Memory locations of completed logs that have a recorded second system counter value greater than the minimum open value.

15. A system for durably persisting computer processor Hardware Transactional Memory (HTM) originally designed for Dynamic Random Access Memory (DRAM) concurrency-controlled transactions with relaxed durability onto Persistent Memory, the system comprising:

A computer processor with HTM support, wherein an HTM concurrency section is started with a single processor hardware instruction and ended with a single processor hardware instruction;

a Persistent Memory component containing a log area;

an HTM interface component;

a platform wide read time step counter component;

an atomic load and increment component;

a transaction interface component configured to:

upon transaction start, open a log, record, update and save a first system counter to the log and start an HTM concurrency section;

upon transaction end, read a second system counter using the platform wide read time step component, end the HTM concurrency section, record a third system counter, and persist the counters and store set to the log and record the completed log location in the ordering component;

and a persistence management component for relaxed durability configured to:

advance the minimum open transaction counter by monitoring the first system counter of open transactions and completed log location values of completed transactions, when the first system counter transaction is completed, advancing the minimum open transaction counter;

place completed transactions in a logical order based on the transaction's second system counter;

determine the minimum open value as the minimum value from the set of first system counter values from all logs not marked as complete;

copy store sets of completed logs to Persistent Memory locations that have a recorded third system counter value greater than the minimum open value.

16. The system of claim 15 further comprising the transaction interface component upon transactional loads and stores, saves all stores to a store set and alias all loads and stores to a shadow memory location to prevent Persistent Memory corruption from cache evictions after HTM end.

17. The system of claim 16 further containing a recovery routine configured to restore the system after a failure by:

reading completed transaction logs;

determining an order of the completed transaction logs based on the second system counter values;

determining the minimum open value as the minimum value from the set of first system counter values from all logs not marked as complete;

and copying the store set to Persistent Memory locations of completed logs that have a recorded third system counter value greater than the minimum open value.

* * * * *